United States Patent
Halmos

(10) Patent No.: US 10,261,187 B2
(45) Date of Patent: Apr. 16, 2019

(54) OPTICAL PHASOGRAMS FOR LADAR VIBROMETRY

(71) Applicant: Raytheon Company, Waltham, MA (US)

(72) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 213 days.

(21) Appl. No.: 15/150,563

(22) Filed: May 10, 2016

(65) Prior Publication Data

US 2017/0329013 A1   Nov. 16, 2017

(51) Int. Cl.
| | |
|---|---|
| *G01S 17/58* | (2006.01) |
| *G01S 7/481* | (2006.01) |
| *G01S 17/10* | (2006.01) |
| *G01S 17/89* | (2006.01) |
| *G01S 17/88* | (2006.01) |
| *G01S 7/48* | (2006.01) |

(Continued)

(52) U.S. Cl.
CPC ............ *G01S 17/58* (2013.01); *G01S 7/4802* (2013.01); *G01S 7/487* (2013.01); *G01S 7/4816* (2013.01); *G01S 7/497* (2013.01); *G01S 17/10* (2013.01); *G01S 17/107* (2013.01); *G01S 17/88* (2013.01); *G01S 17/89* (2013.01)

(58) Field of Classification Search
CPC .......... G01S 17/102; G01S 17/50; G01C 3/08
See application file for complete search history.

(56) References Cited

U.S. PATENT DOCUMENTS

| 8,947,644 B2 | 2/2015 | Halmos |
| 8,947,647 B2 | 2/2015 | Halmos et al. |
| 9,057,605 B2 | 6/2015 | Halmos |

(Continued)

FOREIGN PATENT DOCUMENTS

| CN | 102841355 A | 12/2012 |
| EP | 2605040 A1 | 6/2013 |

(Continued)

OTHER PUBLICATIONS

PCT International Search Report and Written Opinion dated May 9, 2017 for International Application No. PCT/US2017/016891; 16 Pages.

(Continued)

*Primary Examiner* — Luke D Ratcliffe
(74) *Attorney, Agent, or Firm* — Daly, Crowley Mofford & Durkee, LLP

(57) ABSTRACT

Described embodiments provide a laser detection and ranging (LADAR) system. The LADAR system transmits a laser signal including a train of coherent pulses and receives a return signal based on the transmitted laser signal that is reflected from a target. The LADAR system forms one or more range bins of the return signal. Each range bin includes a train of coherent pulses formed based upon the transmitted laser signal. For each range bin, the LADAR system generates a phasogram associated with the train of coherent pulses. The phasogram is generated by determining a relative phase between the return signal and a reference signal. The LADAR system generates a vibration spectrum of the return signal based upon the generated phasogram.

21 Claims, 22 Drawing Sheets
(9 of 22 Drawing Sheet(s) Filed in Color)

(51) Int. Cl.
*G01S 7/487* (2006.01)
*G01S 7/497* (2006.01)

(56) References Cited

U.S. PATENT DOCUMENTS

2004/0021852 A1* 2/2004 DeFlumere ............ F41G 7/008
                                                    356/141.1
2013/0148103 A1* 6/2013 Halmos ................. G01S 17/102
                                                    356/5.09

FOREIGN PATENT DOCUMENTS

JP    2015-094760 A    5/2015
TW       573136 B     1/2004

OTHER PUBLICATIONS

Peng et al., "Sinusoidal Frequency Modulation Fourier Transform and Micro-Doppler Spectrum Estimation of Vibrating Vehicles;" School of Electronic and Engineering, National University of Defense Technology, Changsha, China; 2013; 5 Pages.
Totems et al., "Advanced Signal Processing Methods for Pulsed Laser Vibrometry;" Optical Society of America, vol. 49, No. 20; Jul. 10, 2010; 13 Pages.
Kachelmyer et al., "Laser Vibration Sensing;" The Lincoln Laboratory Journal, vol. 8, No. 1; 1996; 26 Pages.
Kachelmyer et al., "Spectrogram Processing of Laser Vibration Data", Massachusetts Institute of Technology, Lincoln Laboratory; SPIE vol. 1936 Applied Laser Radar Technology (1993); pp. 78-89; 12 pages.
Response (with English Translation & Amended Claims) to Taiwan Office Action dated May 16, 2018 for Taiwan Application No. 106104642; Response filed Jun. 8, 2018; 51 Pages.
Taiwan Office Action (with English Translation) dated May 16, 2018 for Taiwan Application No. 106104642; 8 Pages.
International Preliminary Report on Patentability dated Nov. 22, 2018 for International Application No. PCT/US2017/016891; 8 Pages.
Notice of Allowance dated Nov. 16, 2018 for Taiwanese Application No. 106104642 with English Translations; 3 Pages.

* cited by examiner

OPTICAL PHASOGRAMS FOR LADAR VIBROMETRY

BACKGROUND

A laser detection and ranging (LADAR) sensor, sometimes referred to as laser radar, uses laser beams to measure distances (or ranges) and instantaneous velocities. A LADAR sensor can be used to form images of scenes with a high degree of definition (e.g., 15 cm or better resolution at ranges greater 1,000 meters). LADAR sensors may be mounted on stationary objects or mobile objects such as vehicles or aircraft, for example. In particular, a LADAR sensor may be employed to determine the presence and movement of vibrating objects, for example, a running motor.

SUMMARY

This Summary is provided to introduce a selection of concepts in a simplified form that are further described below in the Detailed Description. This Summary is not intended to identify key or essential features or combinations of the claimed subject matter, nor is it intended to be used to limit the scope of the claimed subject matter.

In one aspect, a method for operating a laser detection and ranging (LADAR) system is provided. The LADAR system transmits a laser signal including a train of coherent pulses and receives a return signal based on the transmitted laser signal that is reflected from a target. The LADAR system forms one or more range bins of the return signal. Each range bin includes a train of coherent pulses formed based upon the transmitted laser signal. For each range bin, the LADAR system generates a phasogram associated with the train of coherent pulses. The phasogram is generated by determining a relative phase between the return signal and a reference signal. The LADAR system generates a vibration spectrum of the return signal based upon the generated phasogram.

In another aspect, an article comprising a non-transitory machine-readable medium that stores executable instructions, the instructions causing a laser detection and ranging (LADAR) system to transmit a laser signal including a train of coherent pulses and receive a return signal based on the transmitted laser signal that is reflected from a target. The LADAR system forms one or more range bins of the return signal. Each range bin includes a train of coherent pulses formed based upon the transmitted laser signal. For each range bin, the LADAR system generates a phasogram associated with the train of coherent pulses. The phasogram is generated by determining a relative phase between the return signal and a reference signal. The LADAR system generates a vibration spectrum of the return signal based upon the generated phasogram.

In another aspect, a laser detection and ranging (LADAR) apparatus is provided. The LADAR apparatus includes a transmitter to transmit a laser signal including a train of coherent pulses and a receiver to receive a return signal based on the transmitted laser signal that is reflected from a target. The LADAR apparatus includes circuitry to form one or more range bins of the return signal. Each range bin includes a train of coherent pulses formed based upon the transmitted laser signal. The LADAR apparatus includes circuitry to generate a phasogram associated with the train of coherent pulses for each range bin. The phasogram is generated by determining a relative phase between the return signal and a reference signal. The LADAR apparatus includes circuitry to generate a vibration spectrum of the return signal based upon the generated phasogram.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

Other aspects, features, and advantages of the described embodiments will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

DETAILED DESCRIPTION

Described herein are a method and apparatus to perform laser range-resolved vibration imaging ("vibrometry"). Laser range-resolved vibration imaging is the ability to provide a vibration spectrum, which is a frequency spectrum representation of a vibration of a target. In one example, laser range-resolved vibration imaging may be used to identify a vibration signature of a target, which is a unique frequency decomposition of the vibration tones of the target's surface, while ignoring clutter (noise) from surroundings of the target that may be also in a line of sight between a laser detection and ranging (LADAR or LIDAR) sensor and the target. Coherent LADAR is increasingly being used to remotely obtain target information that usually needs to be observed at close range. In particular, remote vibration sensing may be used to detect buried mines, for medical triage in a disaster zone, or to detect small movements of targets, such as an idling vehicle.

Figure 1:
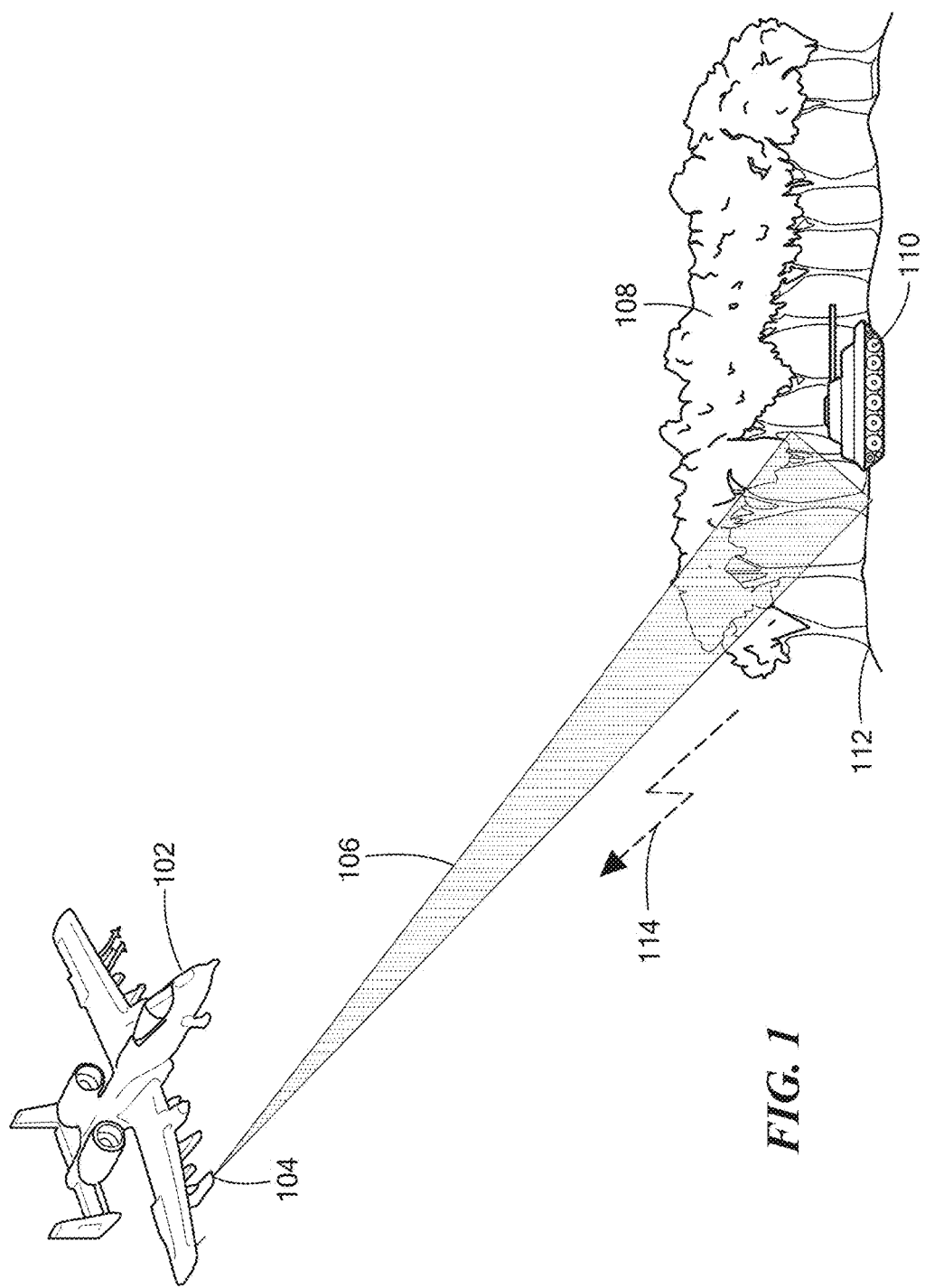
FIG. 1 is a diagram of illustrative application of a LADAR system in accordance with described embodiments.

For instance, FIG. 1 shows an illustrative application of LADAR vibrometry. As shown in FIG. 1, a LADAR transceiver 104 may be mounted on a LADAR targeting system, shown as aircraft 102. Although shown as aircraft 102, LADAR targeting system may be employed on mobile systems such as a vehicle, a watercraft, an aircraft, or may be implemented in stationary systems, or other portable systems. In mobile systems, LADAR transceiver 104 may be travelling at a velocity, $V_P$.

In one example, LADAR transceiver 104 may measure the vibration signature of target 110 resultant from small movements of surfaces of a target 110. Such movements may be relatively small and may be in any direction, including, but not limited to, movements toward and away from LADAR transceiver 104.

In another example, LADAR transceiver 104 may perform laser range-resolved vibration imaging to separate various vibrations that may exist across an extended body, where different portions of the extended body (e.g., the nose, the middle, and the tail of an aircraft airframe) may have different vibration characteristics.

LADAR transceiver 104 emits beam 106 to illuminate a target 110. Target 110 may generally be an idling vehicle, or any other device or object which presence may be detected based on detecting its vibration. Target 110 may be partially covered by one or more interfering objects, shown generally as tree canopy 108 in the illustrative application shown in FIG. 1, but that may include other items, such as camouflage devices. Further, target 110 may be located on or near objects that may reflect beam 106, for example buildings, other vehicles or surfaces, shown generally as ground 112. At least a portion of beam 106 impinges upon and is reflected by target 110 as return signal 114. At least a portion of return signal 114 is received by LADAR transceiver 104.

Typically, the returned signal 114 has the same general waveform as transmitted signal 106 but shifted in time and frequency (e.g., due to the Doppler effect). Additionally, return signal 114 may include constructive and/or destructive interference vectors (e.g., due to speckle, Rayleigh fading and/or multipath). In described embodiments, beam 106 may be a train of coherent short laser pulses. However, beam 106 could alternatively be a continuous wave (CW) train of linear (or non-linear) frequency modulation (FM) chirp waveforms, random frequency shift keying waveforms, random phase shift keying waveforms and so forth, which can be used for vibration imaging.

In order to measure a vibration spectrum of a target, prior art systems performed a series of instantaneous velocity or Doppler measurements of the return signal. Thus, prior art systems generated a vibration spectrum that measures frequency directly as a function of time by taking the fast time (FT) transform of the frequency data (e.g., a spectrogram).

Using spectrograms is beneficial in that the center frequency does not need to be precisely known, which is important when dealing with targets with an un-measured Doppler shift. However, to accurately detect a small target vibration, spectrograms require a fairly large optical carrier-to-noise ratio (CNR).

In contrast to prior art systems, and as will be described herein, illustrative embodiments perform a series of instantaneous phase shift measurements between the return signal and a reference signal to determine a vibration spectrum of the target (e.g., a "phasogram") as a function of time. Further, described embodiments may optionally generate a spectrogram from the phasogram by determining a derivative of the phasogram data.

Figure 2:
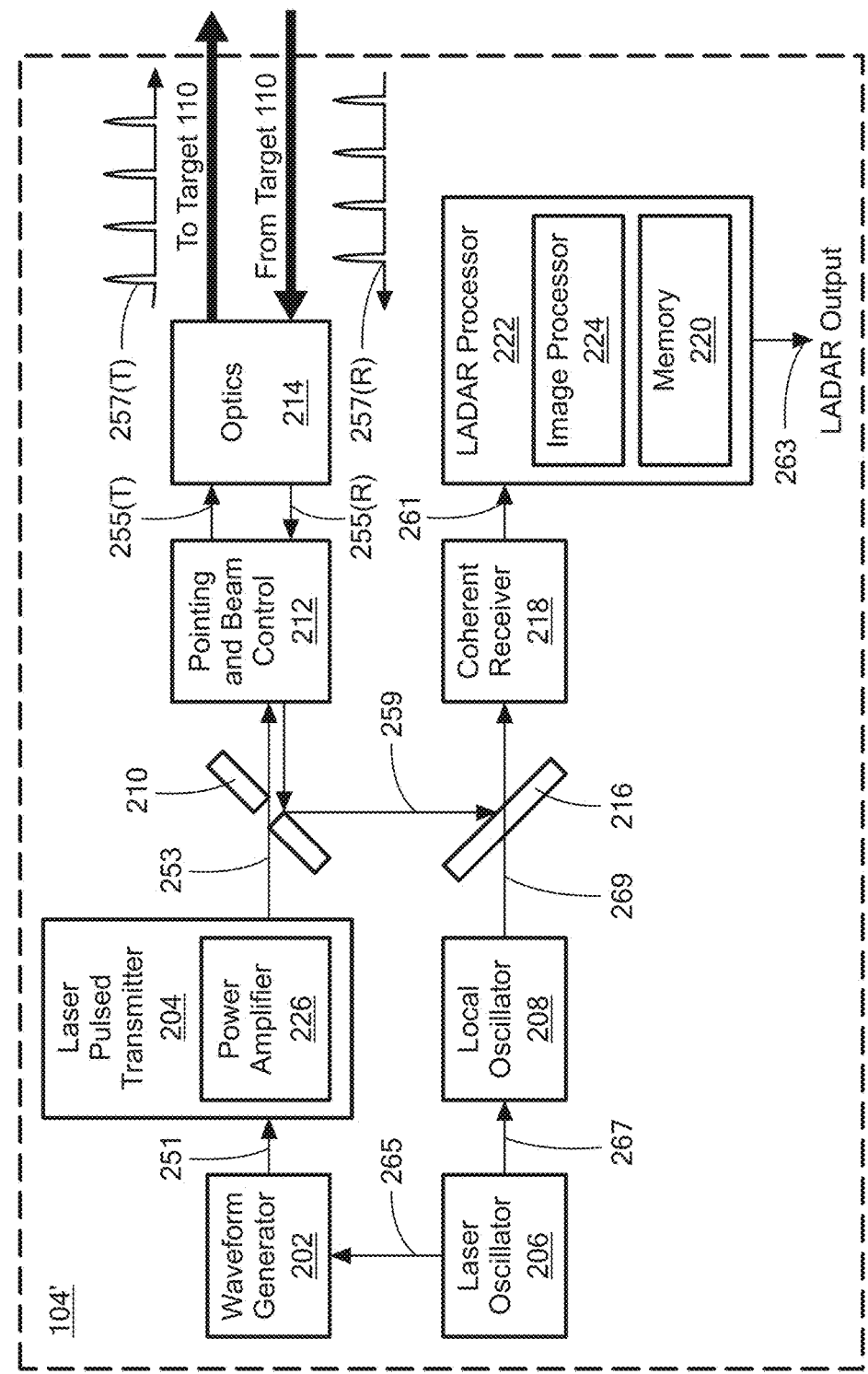
FIG. 2 is a block diagram showing an illustrative LADAR system in accordance with described embodiments.

Referring to FIG. 2, a block diagram of an illustrative embodiment of LADAR transceiver 104 is shown as LADAR transceiver 104'. As shown in FIG. 2, LADAR transceiver 104' includes waveform generator 202 having an input coupled to laser oscillator 206 and an output coupled to laser pulsed transmitter 204. Laser pulsed transmitter 204 includes power amplifier 226. Laser oscillator 206 provides optical signal 265, which is a signal in the range of 200 THz (e.g., an optical signal), to waveform generator 202. Waveform generator 202 generates a desired waveform of the LADAR signal to be transmitted (e.g., as LADAR transmit signal 257(T)), and mixes or modulates optical signal 265 with the desired waveform to generate laser signal 251. Laser pulsed transmitter 204 receives and performs signal processing on laser signal 251, for example amplifying laser signal 251 by power amplifier 226 and generating corresponding laser pulses, to generate laser pulse signal 253.

Laser pulse signal 253 is provided, through mirror 210 (e.g., an aperture (not shown) in mirror 210) to pointing and beam control circuit 212, which may control the focus, size and direction of pulsed laser beam 255. Pulsed laser beam 255(T) is provided to optics 214, which may include an optical zoom and/or telescope, or other optical devices for processing LADAR transmit signal 257(T). LADAR transmit signal 257(T) is transmitted from LADAR transceiver 104' (e.g., as beam 106 shown in FIG. 1) to a target (e.g., target 110 shown in FIG. 1).

As shown in FIG. 2, in some embodiments, pointing and beam control circuit 212 and optics 214 may be shared for both transmitted signals (e.g., 257(T)) and received signals (e.g., return signal 257(R)). In some embodiments, LADAR transmit signal 257(T) is a coherent train of repeating laser pulses. As described, LADAR transmit signal 257(T) is reflected (e.g., by target 110 and/or ground 112 and tree canopy 108) and received by optics 214 of LADAR transceiver 104' as LADAR return signal 257(R). Thus, LADAR return signal 257(R) is a coherent train of repeating laser pulses.

Optics 214 provides returned laser beam 255(R) to pointing and beam control circuit 212, which may control the focus of returned laser beam 255(R). Pointing and beam control circuit 212 directs or otherwise provides returned laser signal 259 (which may be redirected by one or more optical structures, shown generally as mirrors 210 and 216), to coherent receiver 218.

Laser oscillator 206 also provides optical reference signal 267 to local oscillator 208. Based on optical reference signal 267, local oscillator 208 generates reference signal 269, which is provided to coherent receiver 218. Coherent receiver 218 mixes at least a portion of the returned laser signal 259 with reference signal 269, for example to down-convert from optical frequencies (e.g., 200 THz) to lower frequencies, for example, RF frequencies (e.g., in the range of 100 MHz). Coherent receiver 218 may also include one or more filters (not shown) to filter returned laser signal 259 or the down-converted signal. In some embodiments, coherent receiver 218 may be implemented as a Geiger-mode avalanche photodiode (GMAPD) receiver.

The lower frequency output signal, 261, is provided to LADAR processor 222. In some embodiments, lower frequency output signal 261 may be representative of a relative phase of reference signal 269 and returned laser signal 259. Thus, LADAR processor 222 may process phase differences between reference signal 269 and returned laser signal 259. In some embodiments, LADAR processor 222 may also process one or more other signal attributes, such as frequency, amplitude, etc., of returned laser signal 259. In some embodiments, lower frequency output signal 261 may be digitized by LADAR processor 222, and the data corresponding to lower frequency output signal 261 may be stored in memory 220. The stored data of lower frequency output signal 261 is digital data representative of LADAR return signal 257(R) from target 110.

In some embodiments, LADAR processor 222 groups digital data representative of LADAR return signal 257(R) into one or more range bins. Image processor 224 processes each range bin to generate range-resolved phasogram images for each range bin (e.g., such as shown in FIG. 6D). Further, in some embodiments LADAR processor 222 may determine spectrogram images and frequency data from the phasogram images and phase data. LADAR processor 222 provides the phasogram images and phase data associated with the phasogram images as LADAR output signal 263 for further processing (e.g., to identify target 110, etc.). In embodiments that also determine spectrogram images and frequency data, LADAR output signal may also include the spectrogram images and frequency data.

Figure 3A:
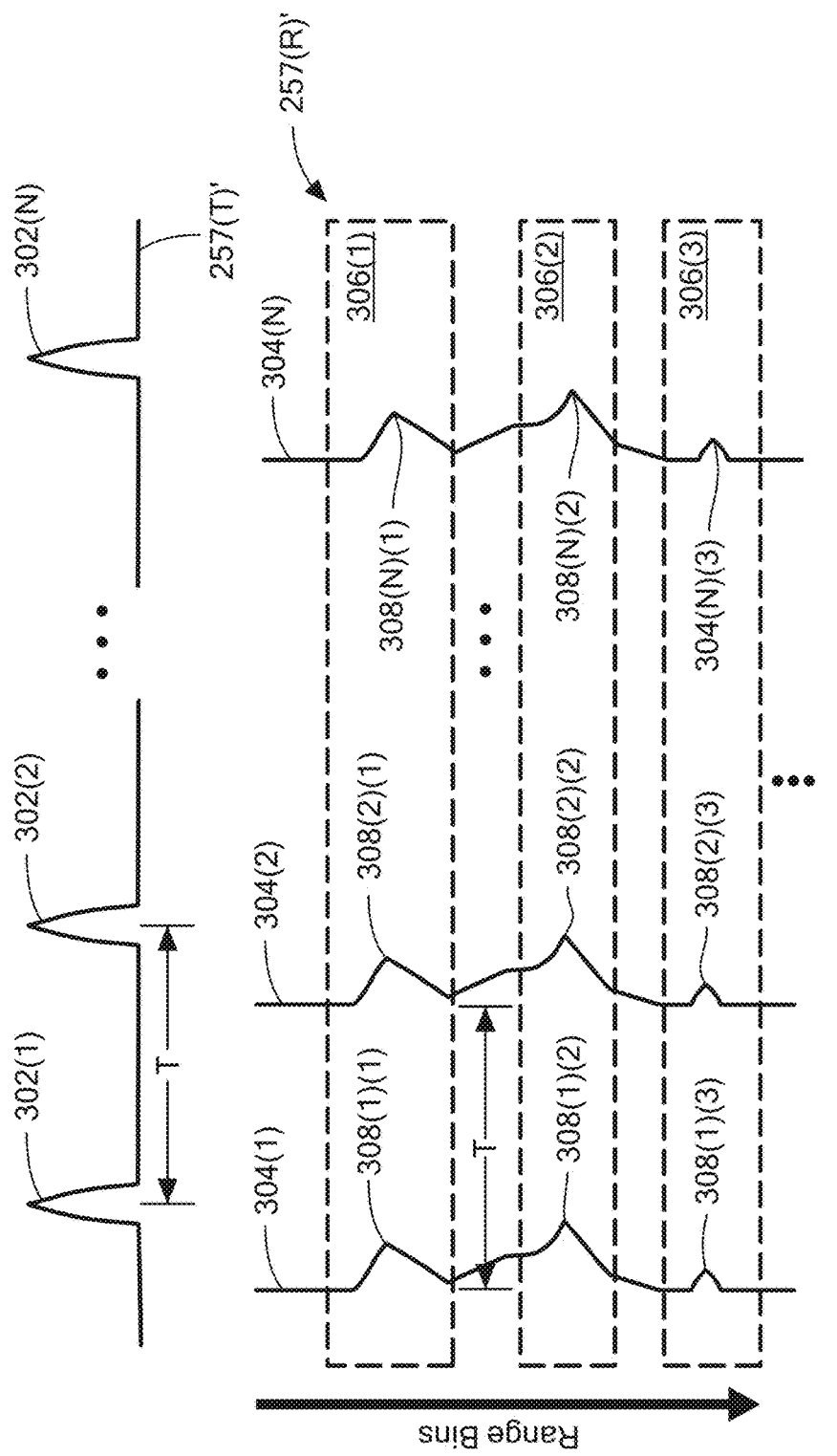
FIG. 3A is a diagram showing illustrative transmit and receive signals of the LADAR system of FIG. 2.

Referring to FIG. 3A, LADAR transmit signal 257(T)' includes a train of pulses 302(1), 302(2) to 302(N). Each pulse is separated by a time, T. After being reflected by target 110, LADAR return signal 257(R)' is also a train of pulses with substantially the same pulse spacing as LADAR transmit signal 257(T)'. As shown, LADAR return signal 257(R)' may include one or more returned pulse trains 304(1)-304(N). Each returned pulse train 304 corresponds to a respective transmit pulse 302. Each returned pulse train 304 includes one or more returned pulses 308, which can be grouped into one or more range bins, shown as range bins 306(1)-306(3).

A range bin represents returned pulses that arrive within a certain time after the original pulse was transmitted. For example, in the first range bin 306(1), returned pulse 308(1)(1) was received within a first certain time after pulse 302(1) was transmitted, returned pulse 308(2)(1) was received within a first certain time after pulse 302(2) was transmitted, and so on. Similarly, in the second range bin 306(2), returned pulse 308(1)(2) was received within a second certain time after pulse 302(1) was transmitted, returned pulse 308(2)(2) was received within a second certain time after pulse 302(2) was transmitted, and so on. Thus, range bins represent the range to target (e.g., the range between LADAR transceiver 104 and target 110) that can be resolved for a given pulse time separation, T. The number, N, of returned pulse trains 304 included in each range bin 306 is determined based upon the coherent processing interval (CPI) of LADAR transceiver 104. By sampling LADAR return signal 257(R)' at the pulse spacing period, the signal for a given range bin 306 is obtained.

The CPI is the "slow time" of LADAR transceiver 104, based on the pulse time separation, T, while the number of range bins that can be resolved is the "fast time" for LADAR transceiver 104. The number of range bins that can be resolved is based upon a faster sampling time that the pulse time separation, which determines the maximum range that is unambiguous. Returned pulses beyond the pulse spacing could be misinterpreted as corresponding to either the first transmitted pulse 302(1) or the second transmitted pulse 302(2). For example, if the pulse spacing is 10 microseconds and the resolution bins are 1 nanosecond wide, then 10,000 range bins can be obtained without ambiguity.

In described embodiments, the train of pulses (e.g., 304) sample a beat frequency between the returned signal (e.g., returned laser signal 259) and the local oscillator (e.g., reference signal 269). As shown in FIG. 3A, LADAR transmit signal 257(T)' is a coherent waveform (e.g., a train of coherent pulses 302) that is transmitted to target 110, and the reflected or returned laser signal 259 is returned to coherent receiver 218. Coherent receiver 218 mixes the target return signal (e.g., signal 259) to a reference signal (e.g., local oscillator signal 269). Mixing the two signals generates a "beat" tone of the frequency difference between the two signals. The frequency and phase of the down mixed signal are a direct translation of the optical frequency and phase (e.g., of signal 259). The determined beat frequency is compared with a digitally created reference signal that is close in frequency to the expected signal frequency, in order to determine the relative phase of the returned signal.

Figure 3B:
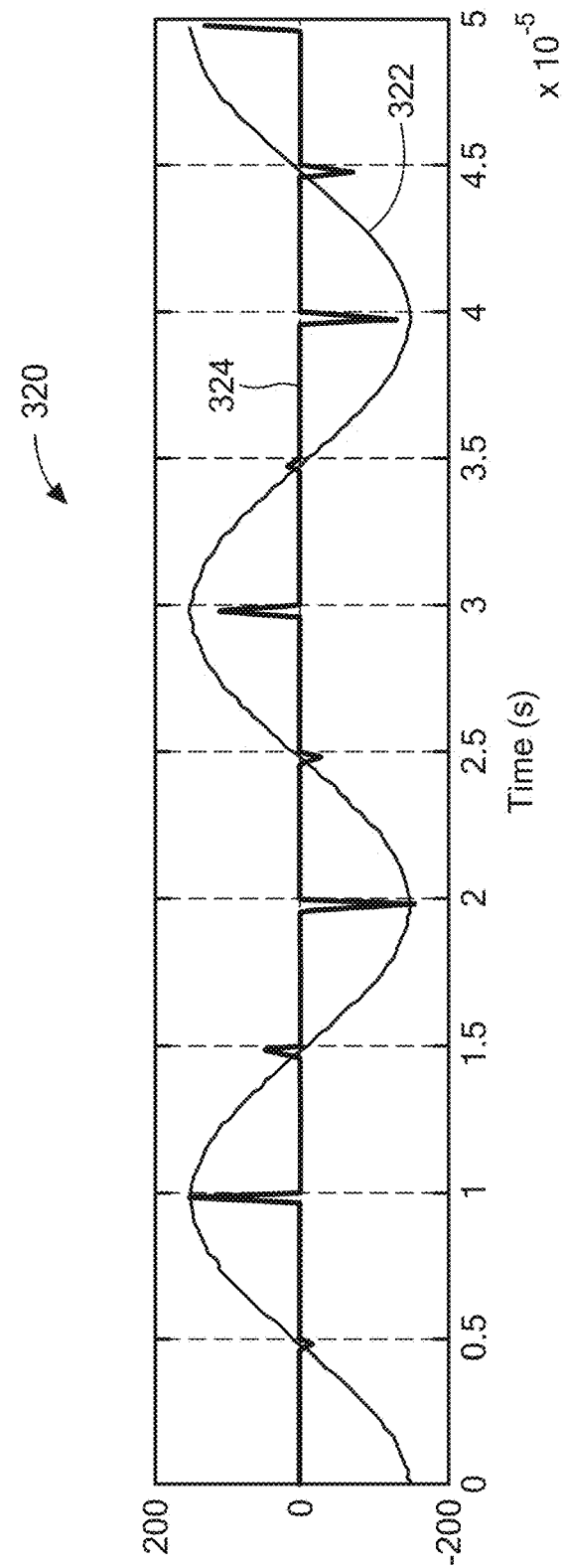
FIG. 3B is a plot showing an illustrative beat of an illustrative reference signal and an illustrative return signal of the LADAR system of FIG. 2.
Figure 3C:
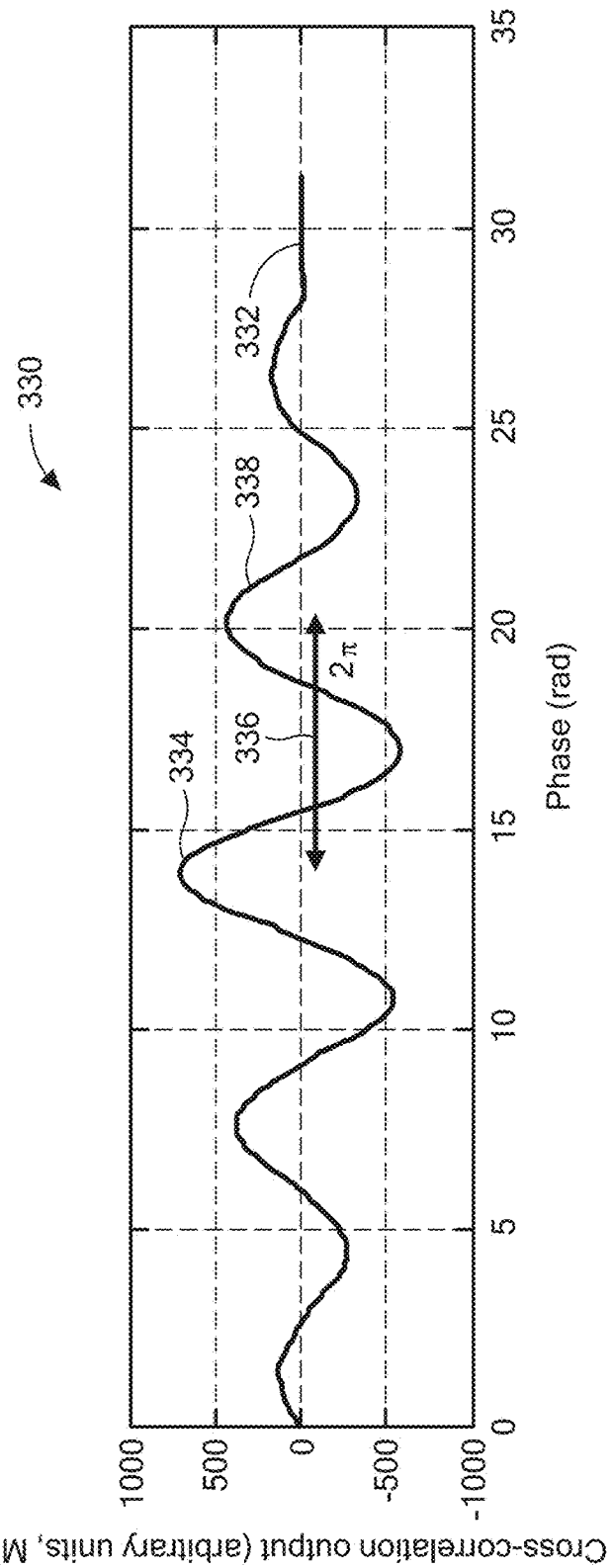
FIG. 3C is a plot showing a cross-correlation between the illustrative reference signal and the illustrative return signal shown in FIG. 3B.

FIG. 3B shows heterodyned pulses of the return signal (e.g., curve 324) and the internally created reference signal (e.g., curve 322), both beating at 50 kHz. There are many possible ways to extract the relative phase of the return signal and the reference signal. Some embodiments employ a cross-correlation technique, in order not to have jumps when the signal is corrupted with noise. FIG. 3C shows a cross-correlated signal generated by LADAR processor 222 based on the reference and target signals.

Once the returned signals are divided into range bins, each single range bin is selected. In some embodiments, the signal is integrated for the coherent integration time, $T_{cit}$, to perform a first Fourier transform, referred to as the fast transform since it uses data collected in a short amount of time (e.g., the sampling time of a single transmitted pulse 302). The samples are collected for a period corresponding to the coherent integration time, $T_{cit}$, and a second Fourier transform is performed on that data. This second transform is referred as the slow transform (e.g., slow Fourier transform) because it uses the data collected at a longer period of time (e.g., over multiple transmitted pulses 302). Typically, any motion compensation would be done on the data of the slow transform (e.g., due to velocity $V_P$ of LADAR transceiver 104). The slow Fourier transform becomes one of the frequency slices used to create a spectrogram. This process is illustrated by FIGS. 4A and 4B.

Inspection of FIG. 3B reveals that mixing the return signal 259 with the local oscillator reference signal 269 generates a beat tone at some expected intermediate frequency (IF), for example, 50 kHz. In described embodiments, the signal sample period, $T_c$, corresponds to one-half of the maximum vibration frequency period, $1/(2f_{vmax})$. The beat tone is generated for each range bin, when using a range-resolved waveform, or for the whole waveform when not range-resolved.

In some embodiments, the coherent samples of the Doppler velocity are used to generate a measurement on the instantaneous velocity spread that is used to generate each spectrograph column. A spectrograph is a pictorial representation of the frequency components of a signal as a function of time. The signal is broken into short time intervals, the coherent processing interval (CPI), during which the signal is assumed to be stationary.

Figure 4A:
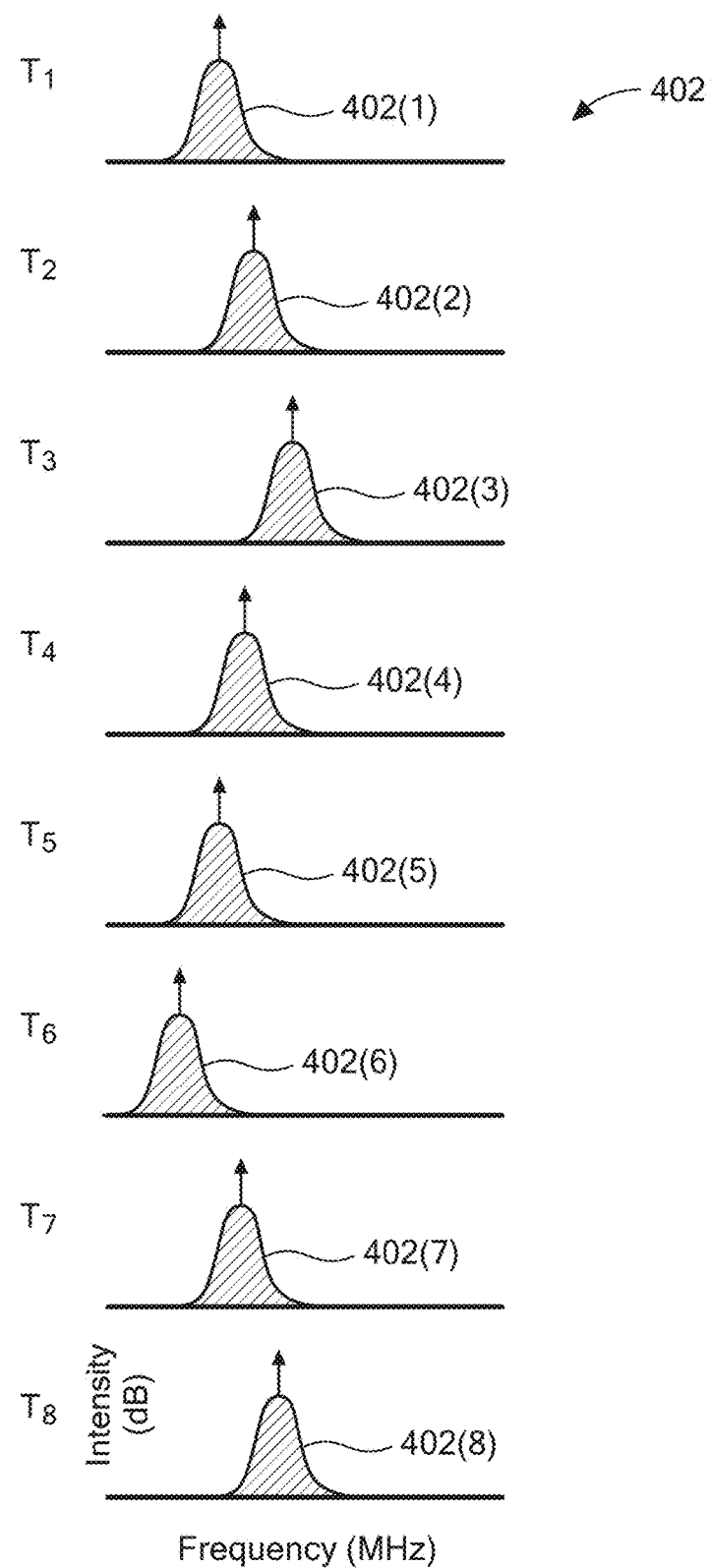
FIG. 4A is a plot showing time-domain signal characteristics of an illustrative return signal received by the LADAR system of FIG. 2.
Figure 4B:
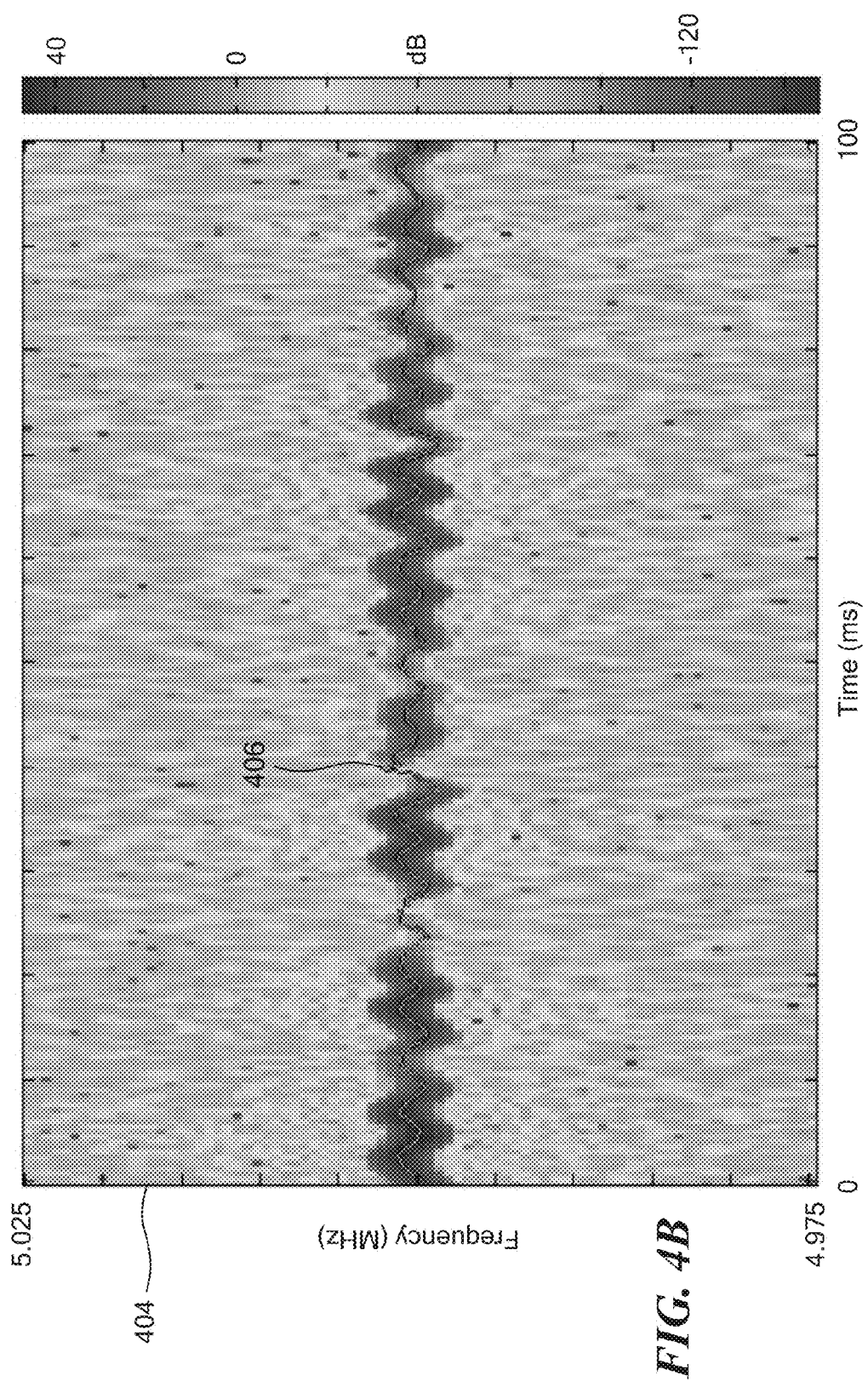
FIG. 4B is a plot showing a spectrogram of an illustrative return signal received by the LADAR system of FIG. 2.

As shown in FIG. 4A, a sequence of Fourier transforms 402(1)-402(8) (showing frequency peaks that shift over time) is generated for each given range bin. Based on the sequence of Fourier transforms for a given range bin, a single column of the resultant spectrogram 404 is generated, as shown in FIG. 4B. From each vertical slice of the spectrogram, an estimation of the peak is made, from which curve 406 may be derived, which represents a Doppler frequency as a function of time. Thus, the Doppler Nyquist frequency is set by the integration time of individual Fourier transforms within a spectrogram.

Figure 4C:
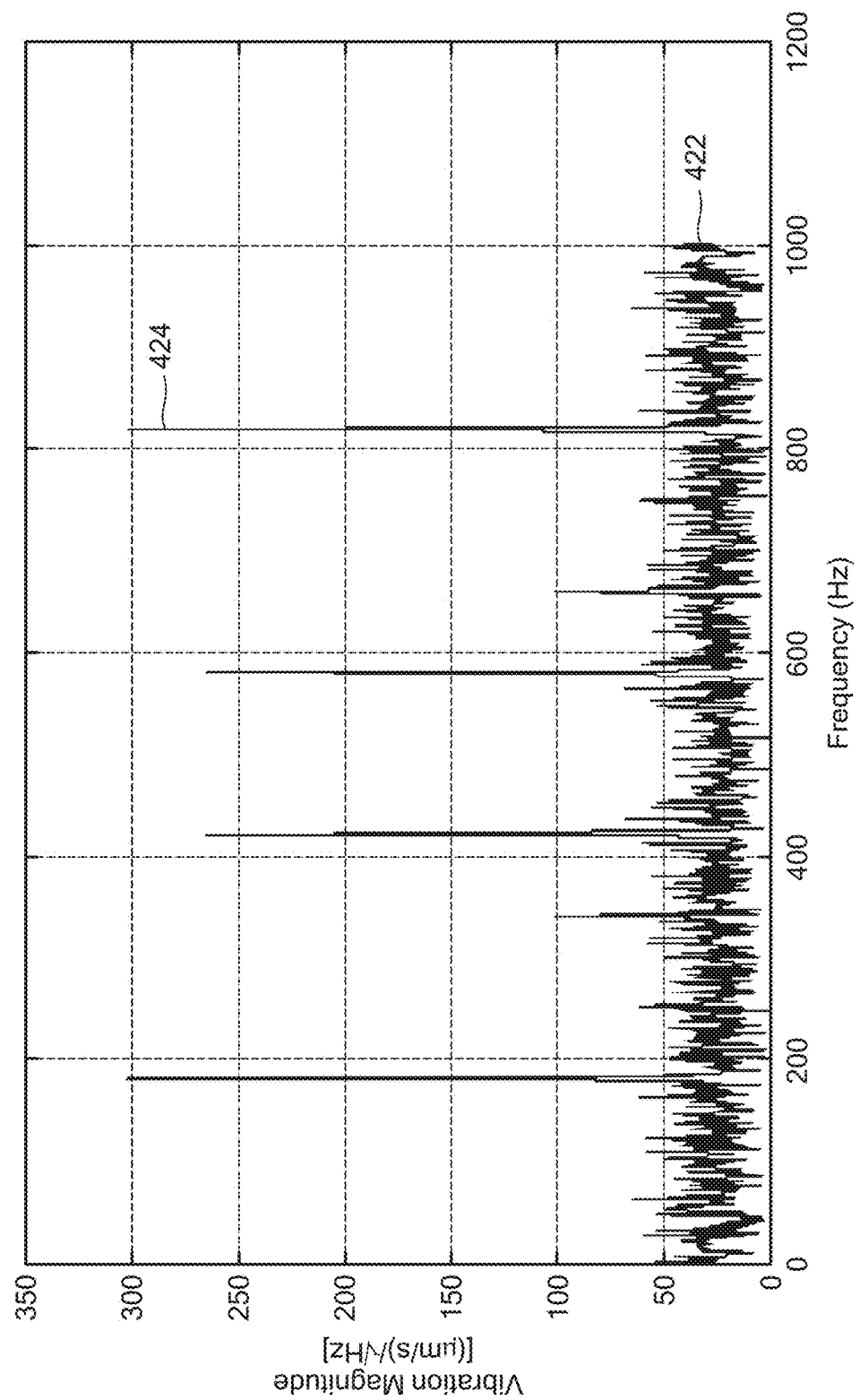
FIG. 4C is a plot showing the power spectral density of the spectrogram of FIG. 4B.

As shown in FIG. 4C, a target vibration spectrum may be generated by taking the Power Spectral Density (PSD), which is the magnitude of the Fourier Transform, of the time sequence of Doppler estimations. Such an approach yields spectrum 422 having one or more peaks 424 corresponding to frequencies of vibration. Since this process is done for each range bin, the resulting spectrogram and vibration spectrum are range-resolved.

Thus, a spectrogram tracks the instantaneous target velocity (e.g., Doppler shift) as a function of time. Taking the Fourier transform of the instantaneous target velocity generates the vibration spectrum of the target. The sensitivity of the vibration measurement is determined by the noise floor of the measurement referred as the Noise Equivalent Velocity of Vibration, or NEVV. Various effects contribute to the NEVV, and one among them is the carrier-to-noise ratio (CNR) of the spectrogram measurements. For example, NEVV is proportional to the square root of the CNR, as given by: $NEVV \propto \sqrt{CNR}$. In described embodiments, to keep the contribution of the signal CNR to the NEVV negligible, the CNR is beneficially limited to about 10 dB or better (e.g., a higher CNR value).

Figure 5A:
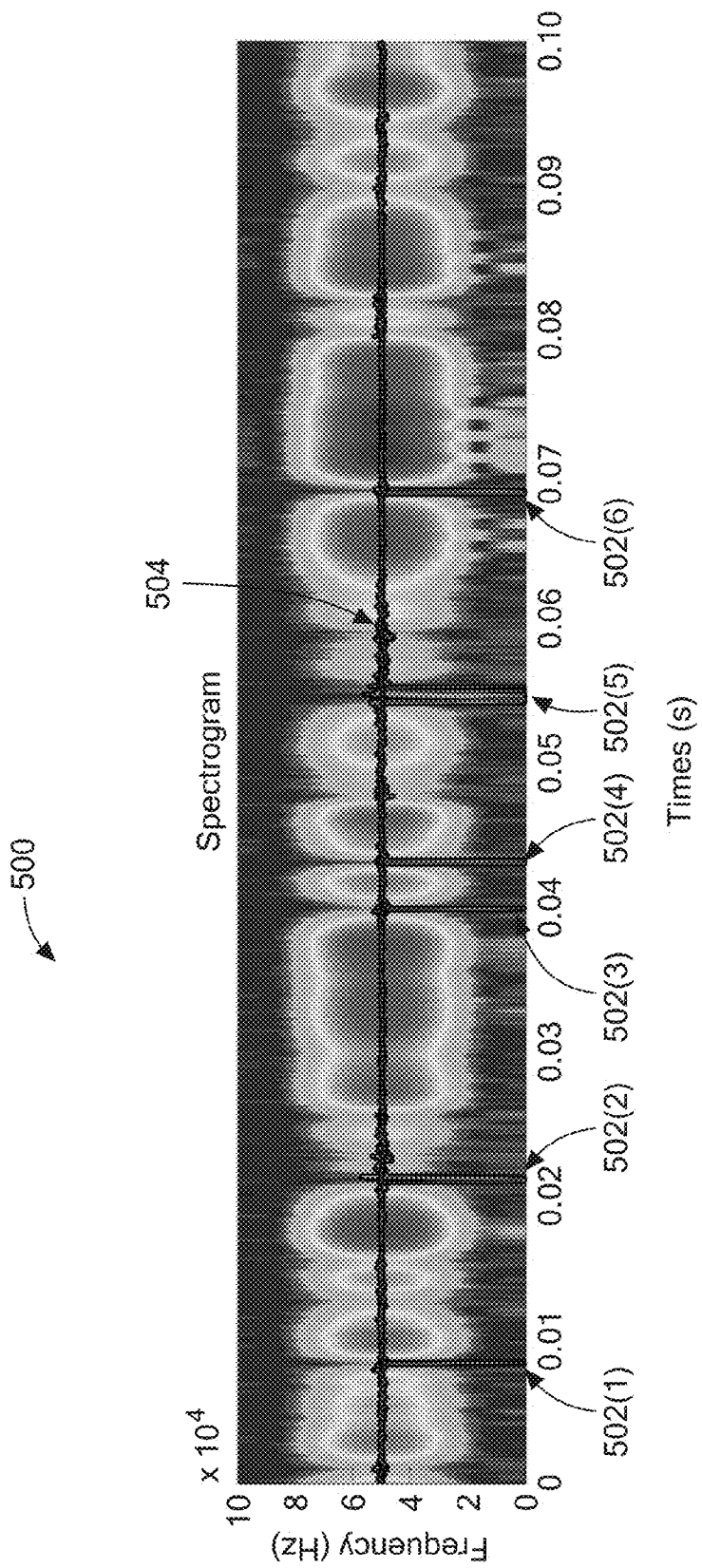
FIG. 5A is another plot showing a spectrogram of an illustrative return signal received by the LADAR system of FIG. 2.

FIG. 5A shows an example spectrogram for a simulated return signal with the parameters in Table 1:

TABLE 1

| List of signal simulation parameters for the spectrogram of FIG. 5A | |
| --- | --- |
| CNR | 23 dB (200) |
| Speckle Frequency | 100 Hz |

TABLE 1-continued

| List of signal simulation parameters for the spectrogram of FIG. 5A | |
| --- | --- |
| Coherent Integration Time, $T_{cit}$ | 50 µs |
| Spectrogram Time | 100 ms |
| Intermediate Frequency | 50 kHz |
| Vibration Frequency | 100 Hz, 500 Hz, 9 kHz |
| Vibration Intensity | 100 µm/s |

Figure 5B:
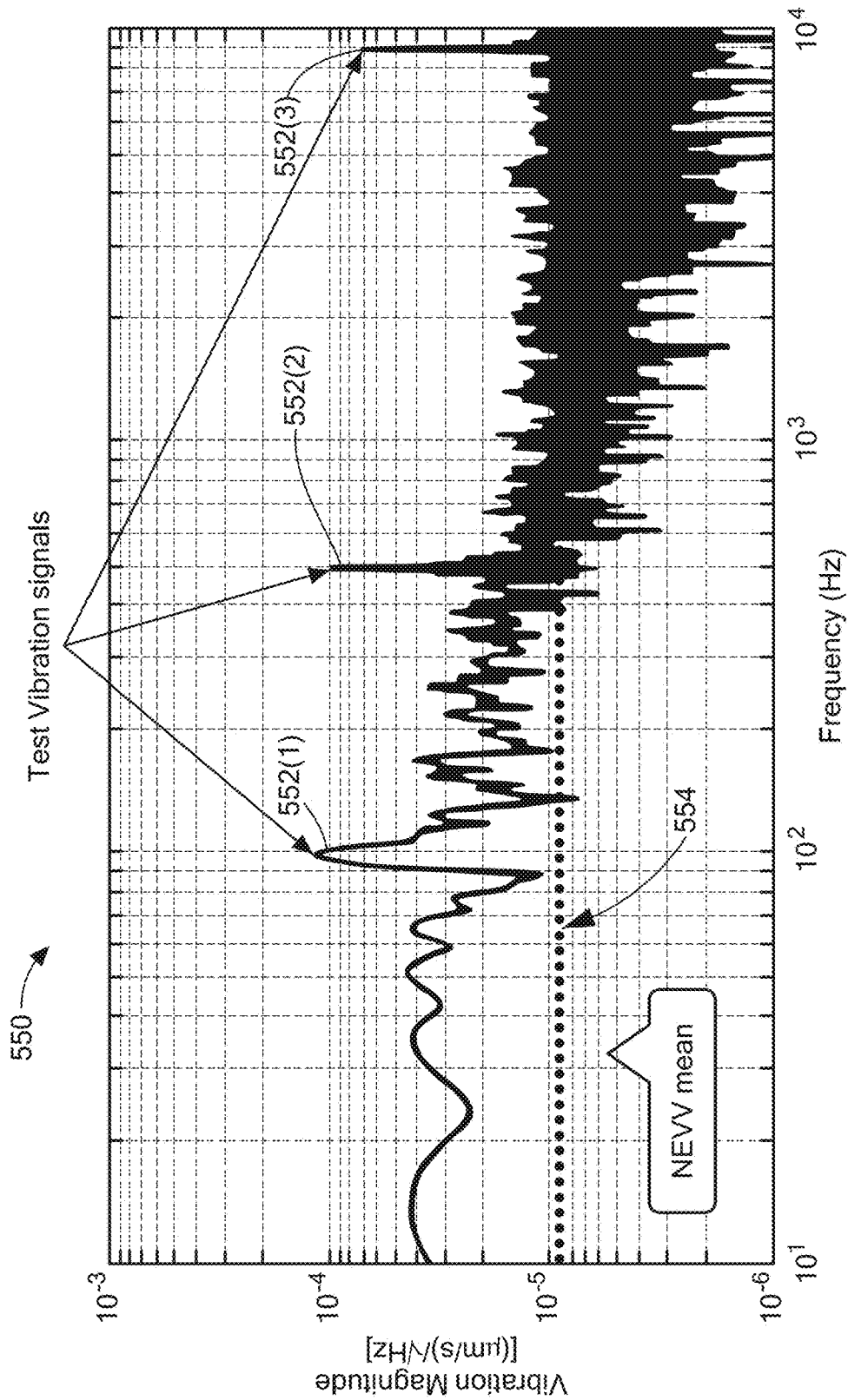
FIG. 5B is a plot showing an achieved noise equivalent velocity (NEVV) versus frequency for the spectrogram of FIG. 5A.

The instantaneous frequency estimation is obtained by selecting the peak of each slice of the spectrogram, shown in white (e.g., peaks 502). When the signal fades (e.g., due to speckle), the peak is an off-center noise peak, hence when signal fades are detected, the result is interpolated, shown as green trace 504. Taking the magnitude of the Fourier Transform of the green trace, we get the vibration spectrum of the signal, as shown in FIG. 5B. As shown in FIG. 5B, the simulated vibration frequencies at 100 Hz, 500 Hz, and 9 kHz correspond to peaks 552(1), 552(2) and 552(3). The floor of the vibration spectrum represents the sensitivity achieved (e.g., the sensitivity of the LADAR sensor), and that is referred as the Noise Equivalent Vibration Velocity or NEVV, shown as NEVV 554.

To improve the achieved sensitivity achieved by spectrograms, described embodiments employ phasograms to track return signal phase over time. In contrast to the spectrogram which tracks Doppler shift as a function of time and having a Fourier transform that generates the vibration spectrum of the target, phasograms track the phase change of the of the return signal as a function of time to produce a much more sensitive measurement of the vibration spectrum. As described regarding FIGS. 3A-3C, a train of coherent pulses is transmitted and reflected by a target as a return signal to the receiver. As shown in FIG. 3B, mixing the return signal 259 with the local oscillator reference signal 269 generates a beat tone at some expected intermediate frequency (IF), for example, 50 kHz.

Referring back to FIG. 3C, some embodiments determine the relative phase of the return signal and the reference signal by cross-correlation for each return pulse train. As shown in FIG. 3C, each cross-correlated signal 332 has a peak magnitude 334. In some embodiments, for each sample (coherence integration time, $T_{cit}$, of 50 µs), the phase of the return signal is tracked by finding the peak of each cross-correlation in a given range bin. In some instances, one or more other, secondary, peaks 338 may have a $2\pi$ phase offset from peak 334, shown as offset 336.

Figure 6A:
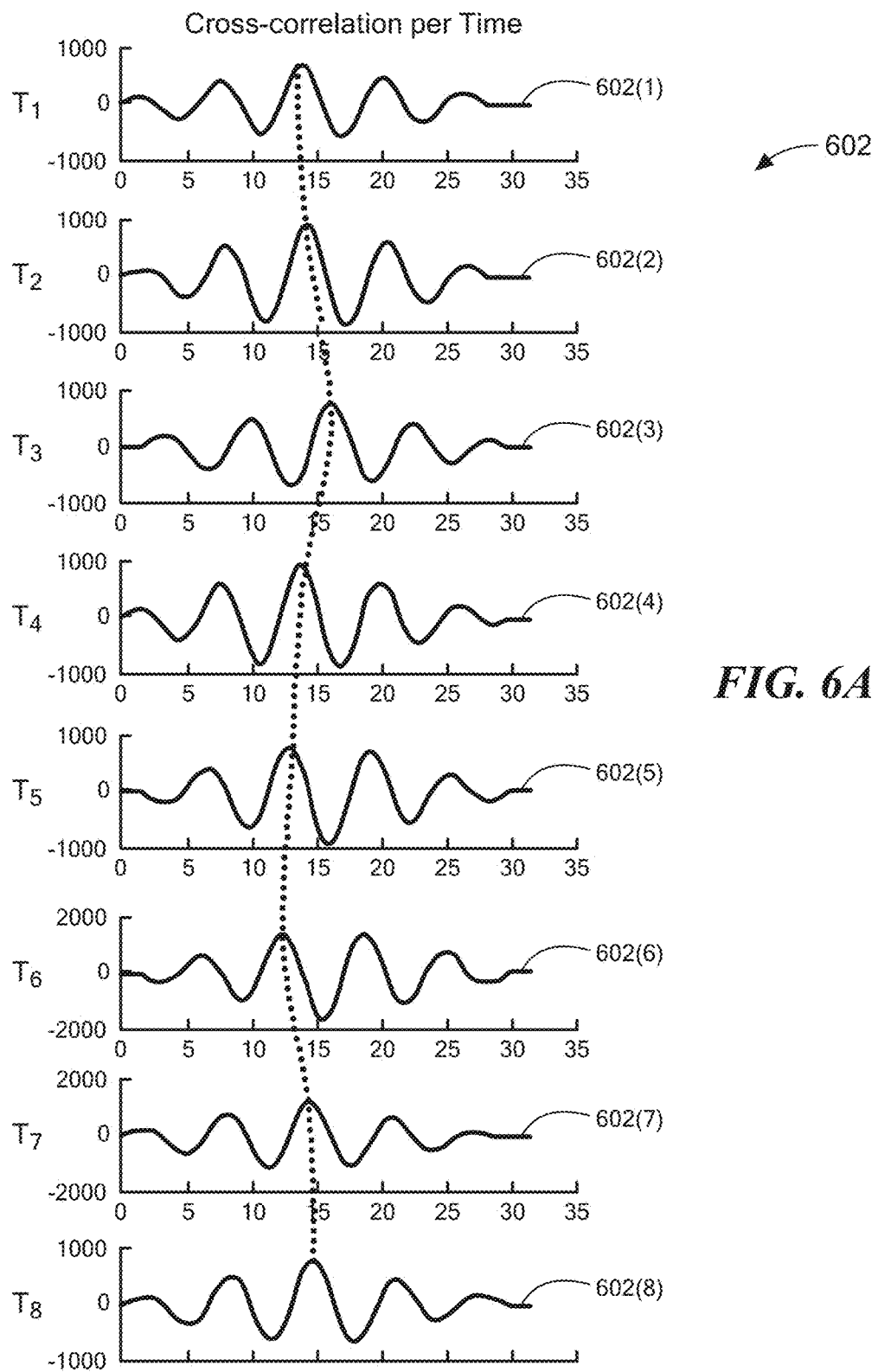
FIG. 6A is a plot showing time-domain cross-correlated signal characteristics of an illustrative return signal received by the LADAR system of FIG. 2.
Figure 6B:
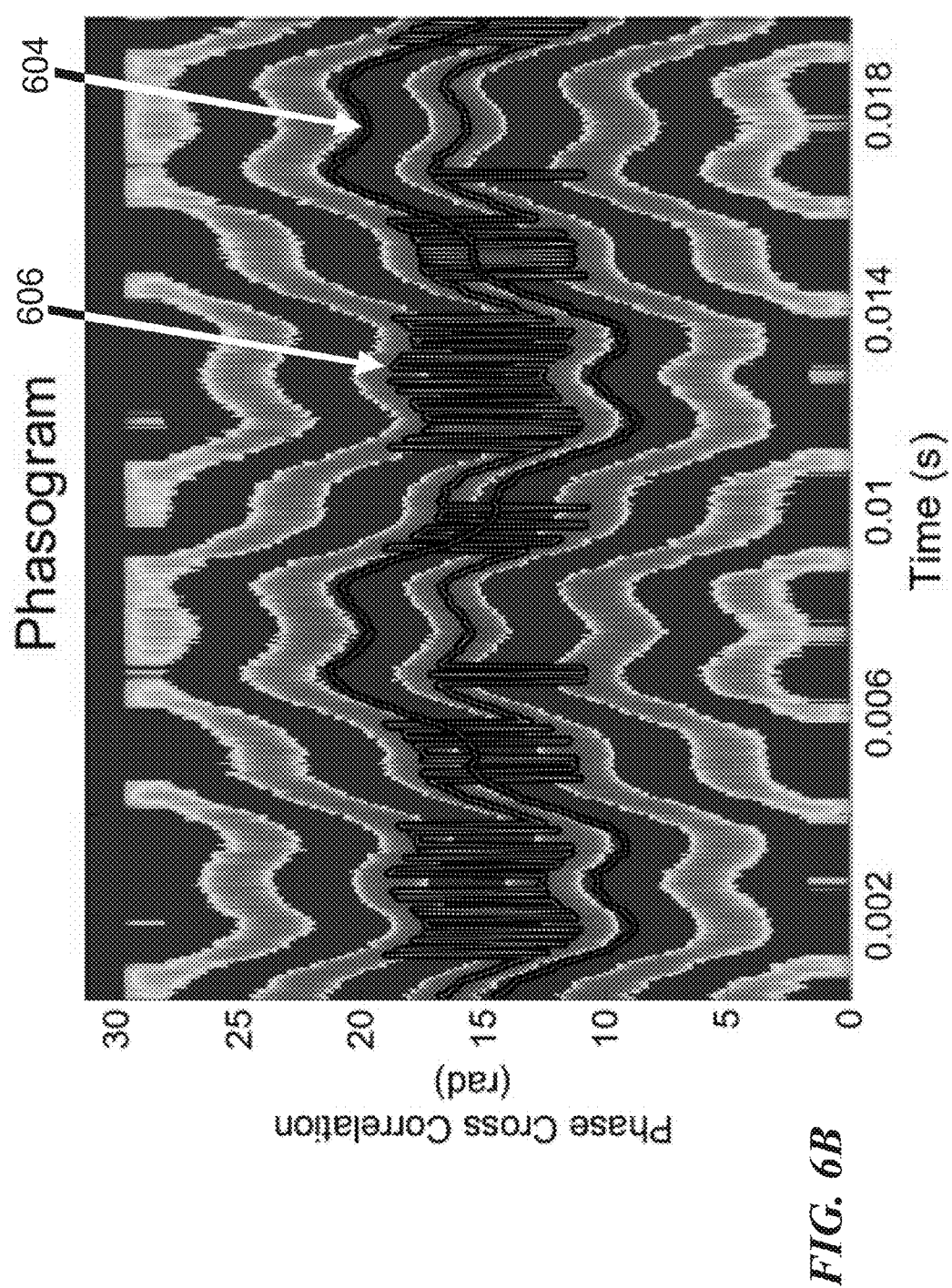
FIG. 6B is a plot showing a wrapped phasogram of signal characteristics of an illustrative return signal received by the LADAR system of FIG. 2 for the test signal shown in FIG. 6C.

For example, as shown in FIG. 6A, a sequence of cross-correlations 602(1)-602(8) (showing relative phase peaks that shift over time) is generated for each given range bin. Based on the sequence of cross-correlations 602(1)-602(8) for a given range bin, a single column of the resultant phasogram is generated and plotted as a function of time, as shown in FIG. 6B. From each vertical slice of the phasogram, an estimation of the peak is made, creating a derived phase signal as a function of time, shown as 604.

Figure 6C:
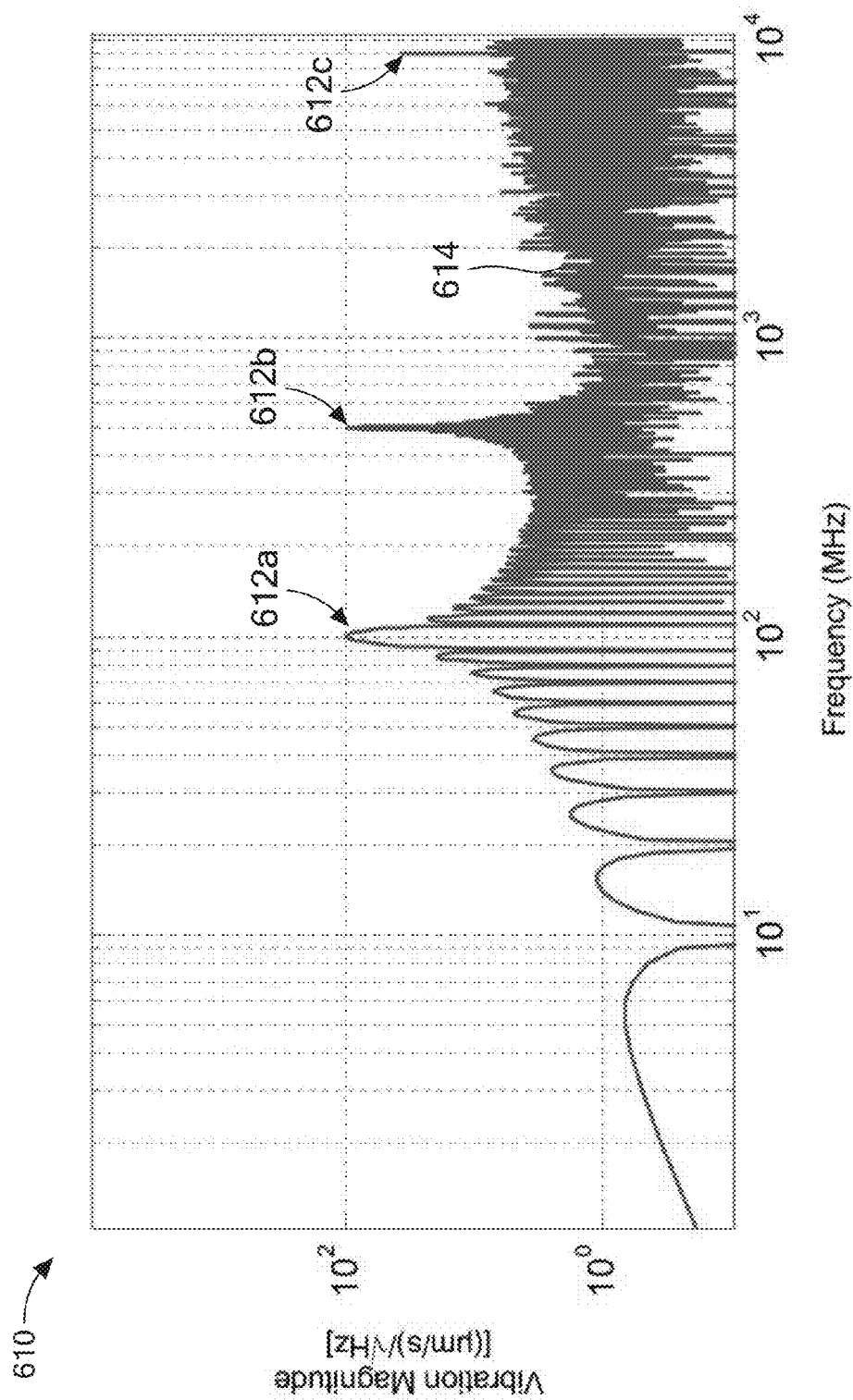
FIG. 6C is a plot showing signal characteristics of an illustrative test signal of the LADAR system of FIG. 2.
Figure 6D:
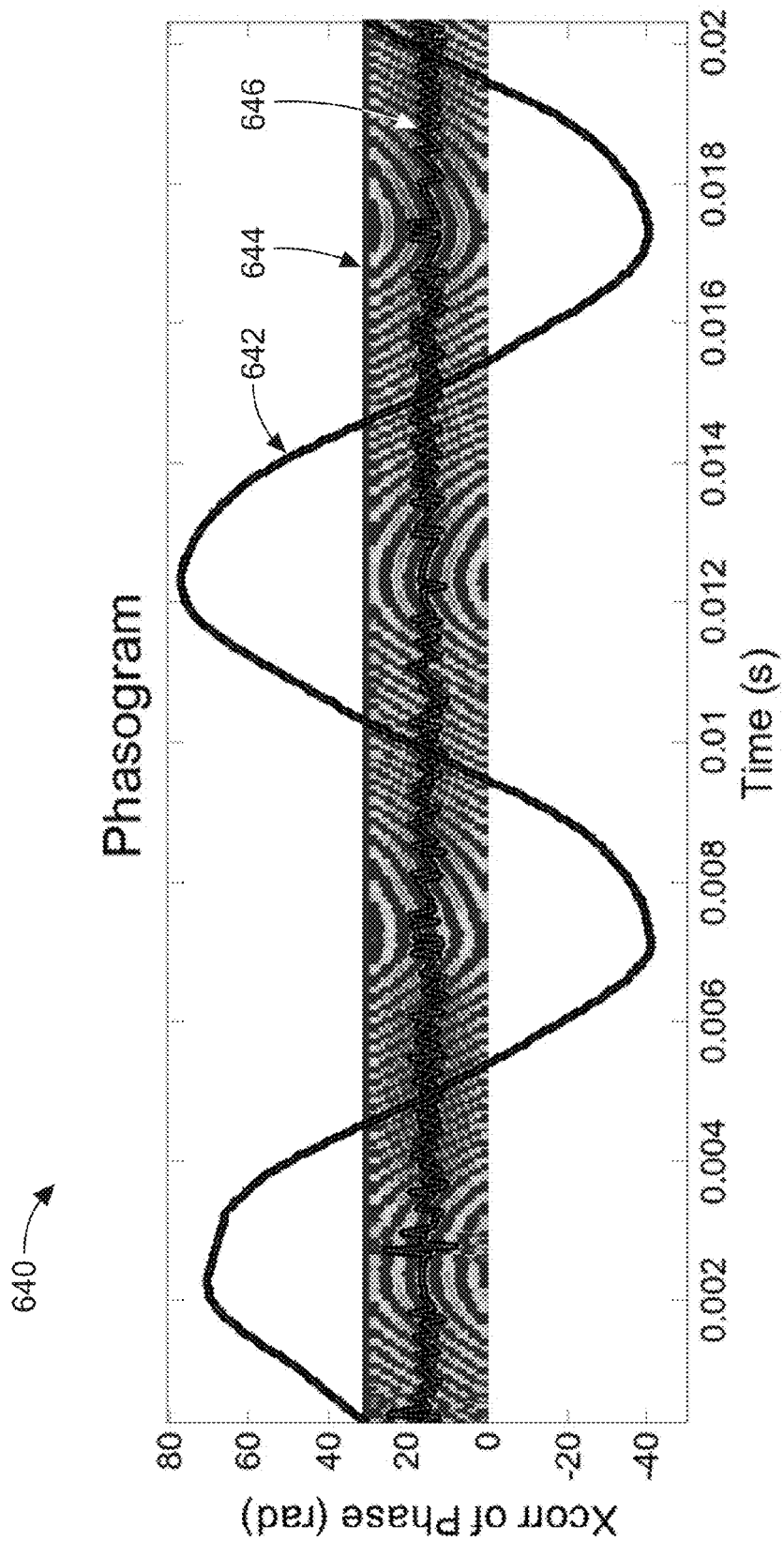
FIG. 6D is a plot showing an unwrapped phasogram of signal characteristics of an illustrative return signal received by the LADAR system of FIG. 2 for the test signal shown in FIG. 6C.

As shown in FIG. 6C, the target vibration spectrum is generated by taking the derivative of the unwrapped phase signal to determine a frequency history, and then determining the vibration spectrum by determining a magnitude of the Fourier Transform (e.g., an FFT) of the derivative. The vibration spectrum is shown as curve 614 having one or more peaks 612 showing frequencies of vibration (in this case, three peaks, 612a, 612b and 612c, corresponding to the test vibration frequencies at 100 Hz, 500 Hz, and 9 kHz from Table 1). Since this process is done for each range bin, the resulting phasogram and vibration spectrum are range-resolved.

As shown in FIG. 6B, the peak of the phase plot can jump by $2\pi$ as the phase drifts (shown as phase jumps 606). To reduce, or ideally eliminate, the phase jumps, described embodiments "unwrap" the determined cross-correlated phase peaks. A "wrapped" phase signal varies over an interval of $2\pi$ (e.g., $-\pi$ to $\pi$, or 0 to $2\pi$, etc.) but may have signal discontinuities (e.g., jumps) at the end of each $2\pi$ interval. Phase unwrapping is a signal processing technique that adds (or subtracts) multiples of $2\pi$ to the wrapped phase signal when there are large jumps between consecutive phase values (e.g., at the end of each $2\pi$ interval). The "unwrapped" phase signal is, thus, a continuous signal without discontinuities (e.g., jumps) at $2\pi$ intervals, for example as shown in FIG. 6D as unwrapped phase signal 642.

Further, described embodiments track the signal strength of the return signal. When the return signal strength drops below a noise threshold (e.g., due to speckle of fading), signal values may be interpolated (e.g., by LADAR processor 222) based on one or more surrounding values (e.g., one or more prior samples).

By taking the derivative of the phase signal and then looking at the magnitude of the Fourier Transform of the derivative, the vibration spectrum of the target is determined, as shown in FIG. 6C. As shown in FIG. 6D, plot 644 shows the wrapped phase signal, and curve 642 is the unwrapped phase signal, without any $2\pi$ phase jumps. The instantaneous phase estimation is obtained by selecting the peak of each slice of the phasogram, shown in white as peak signal 646. We then unwrap the phase to remove the ambiguous $2\pi$ jumps as well as interpolating when the signal fades, for example due to speckle, resulting in unwrapped phase signal 642. Taking the magnitude of the Fourier Transform of unwrapped phase signal 642 gives the vibration spectrum of the target, shown in FIG. 6C.

Figure 7A:
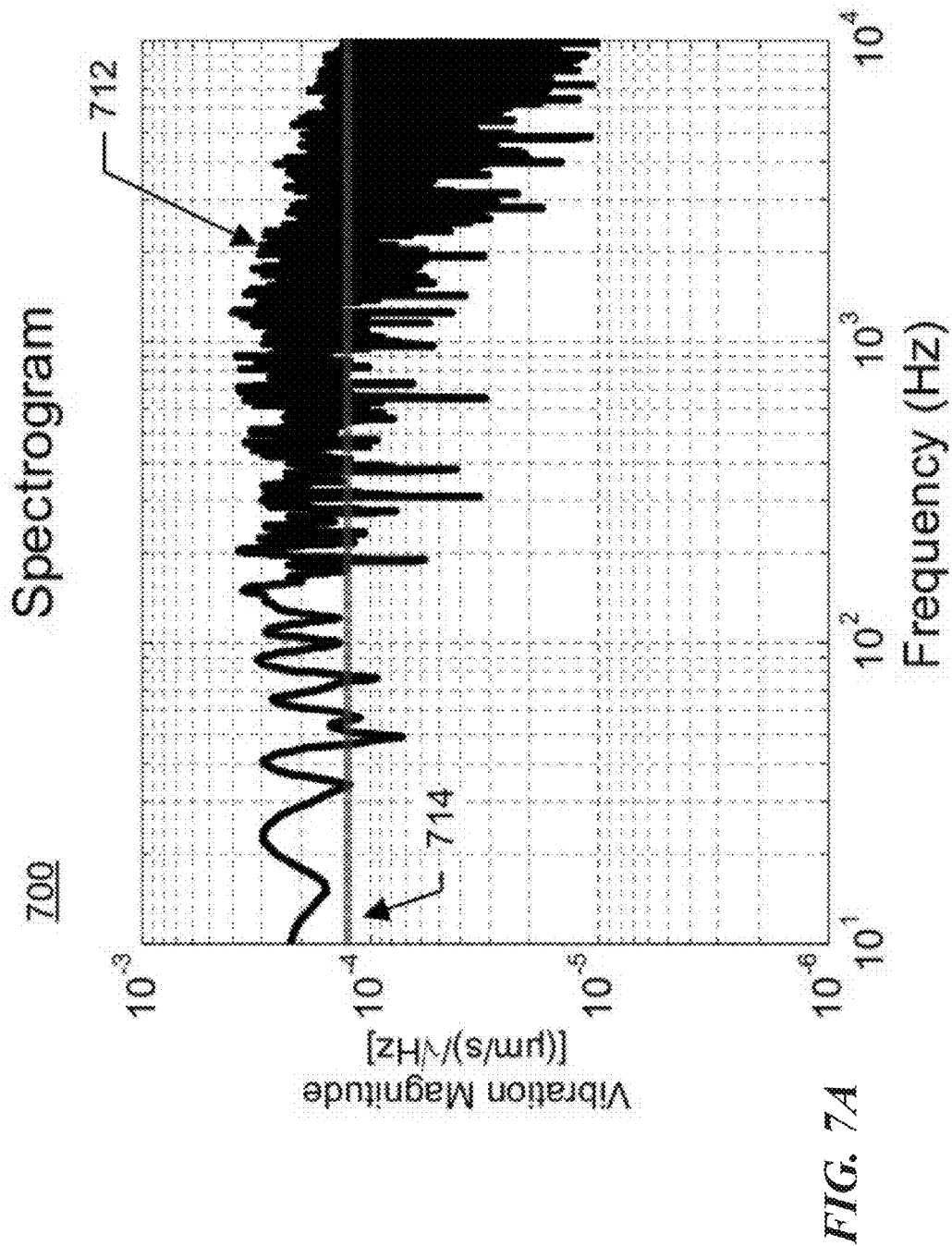
FIG. 7A is a plot showing an achieved noise equivalent velocity (NEVV) versus frequency at a carrier-to-noise ratio (CNR) of 10 for the spectrogram of FIG. 5A.
Figure 7B:
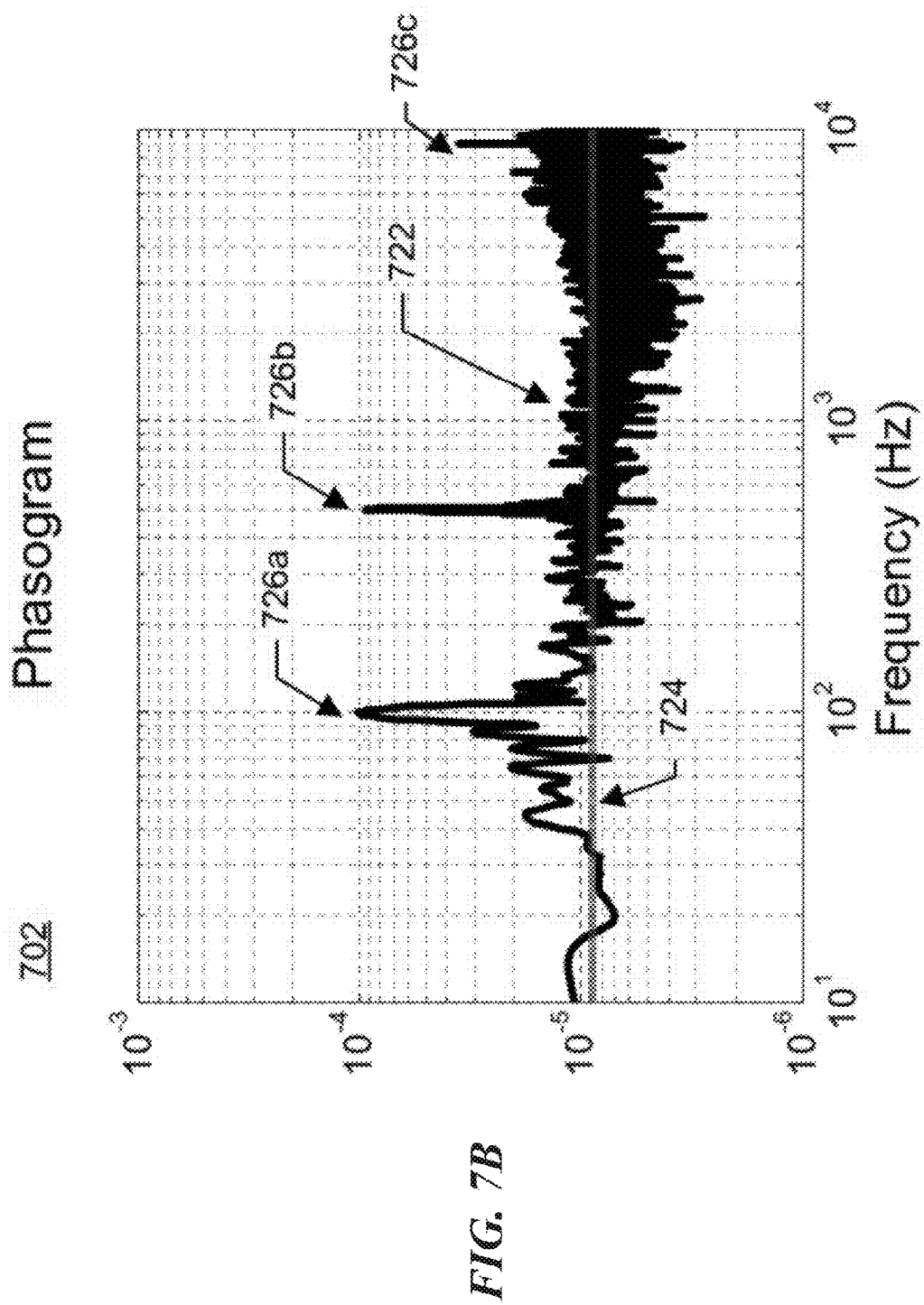
FIG. 7B is a plot showing an achieved noise equivalent velocity (NEVV) versus frequency at a carrier-to-noise ratio (CNR) of 10 for the phasogram of FIG. 6D.

Similarly as for the spectrogram, the sensitivity of the vibration measurement is determined by the noise floor of the measurement referred as the Noise Equivalent Velocity of Vibration, or NEVV. FIGS. 7A and 7B compare the vibration spectrum obtained via a spectrogram 700 (FIG. 7A) and the vibration spectrum obtained via a phasogram 702 (FIG. 7B) for the test conditions in Table 1 (e.g., test vibration tones at 100 Hz, 500 Hz, and 9 kHz). FIGS. 7A and 7B are illustrative of the achieved vibration spectra for a CNR of 10 (e.g., low return signal intensity). As shown the phasogram achieves higher sensitivity than the spectrogram (e.g., NEVV 724 if FIG. 7B is much lower than the average NEVV 714 of FIG. 7A). As shown in FIG. 7A, for a CNR of 10, the vibration signatures completely disappear within the noise floor (e.g., 712 or 722) for spectrogram processing, but are easily determined (e.g., peaks 726a, 726b and 726c are well above the noise floor) for phasogram processing, as shown in FIG. 7B.

Figure 8:
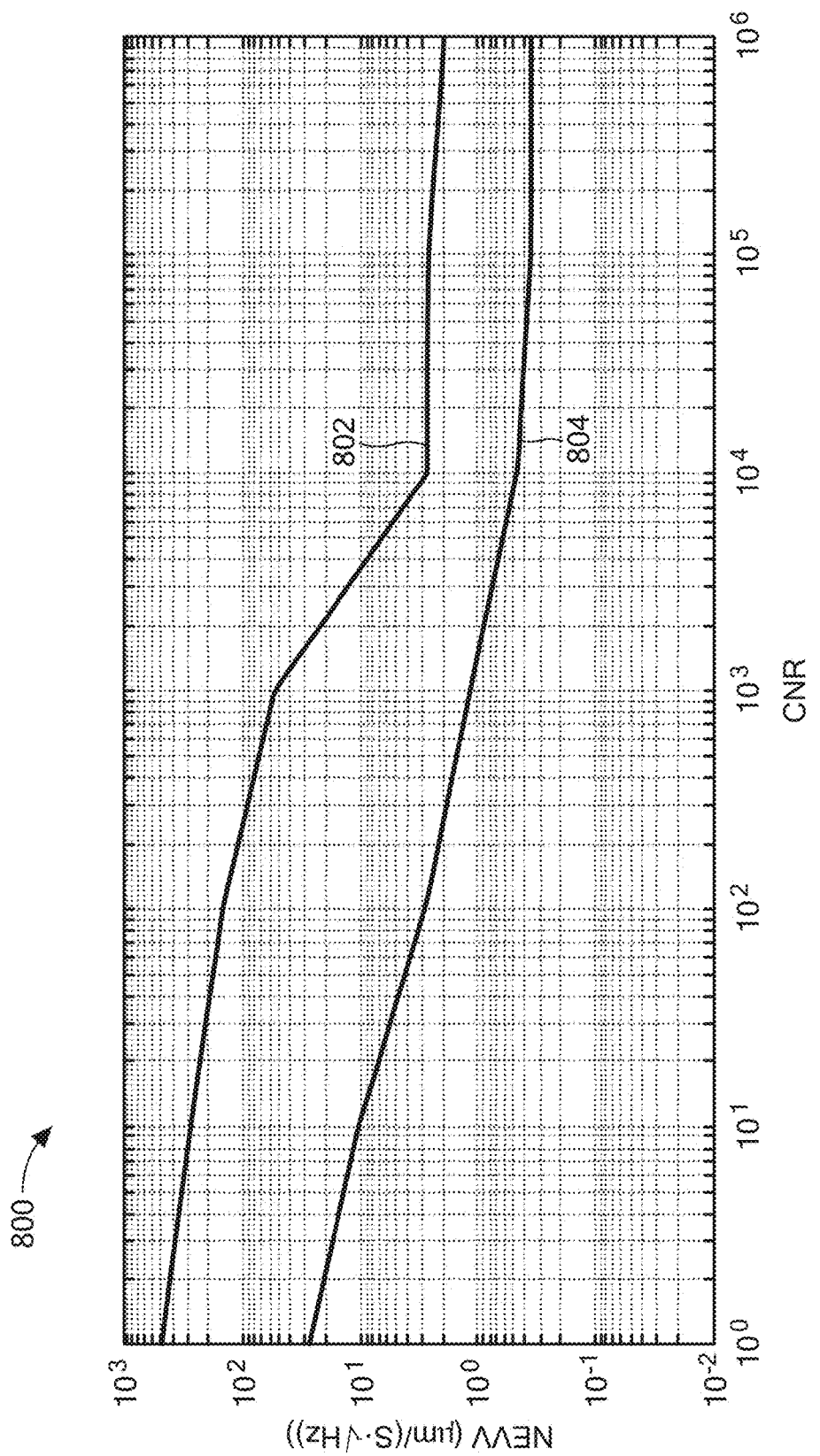
FIG. 8 is a plot showing an achieved noise equivalent velocity (NEVV) versus carrier-to-noise ratio (CNR) for the spectrogram of FIG. 5A and the phasogram of FIG. 6D.

FIG. 8 shows a plot 800 of the mean NEVV of spectrogram processing (curve 802) and phasogram processing (curve 804) versus the signal CNR. FIG. 8 is determined for an illustrative 100 Hz speckle frequency, as given in Table 1. As shown in FIG. 8, the achieved sensitivity of LADAR systems employing phasograms at low CNR levels (e.g., 10 or below) can be close to 100 times better than the achieved sensitivity of LADAR systems employing spectrograms.

Figure 9A:
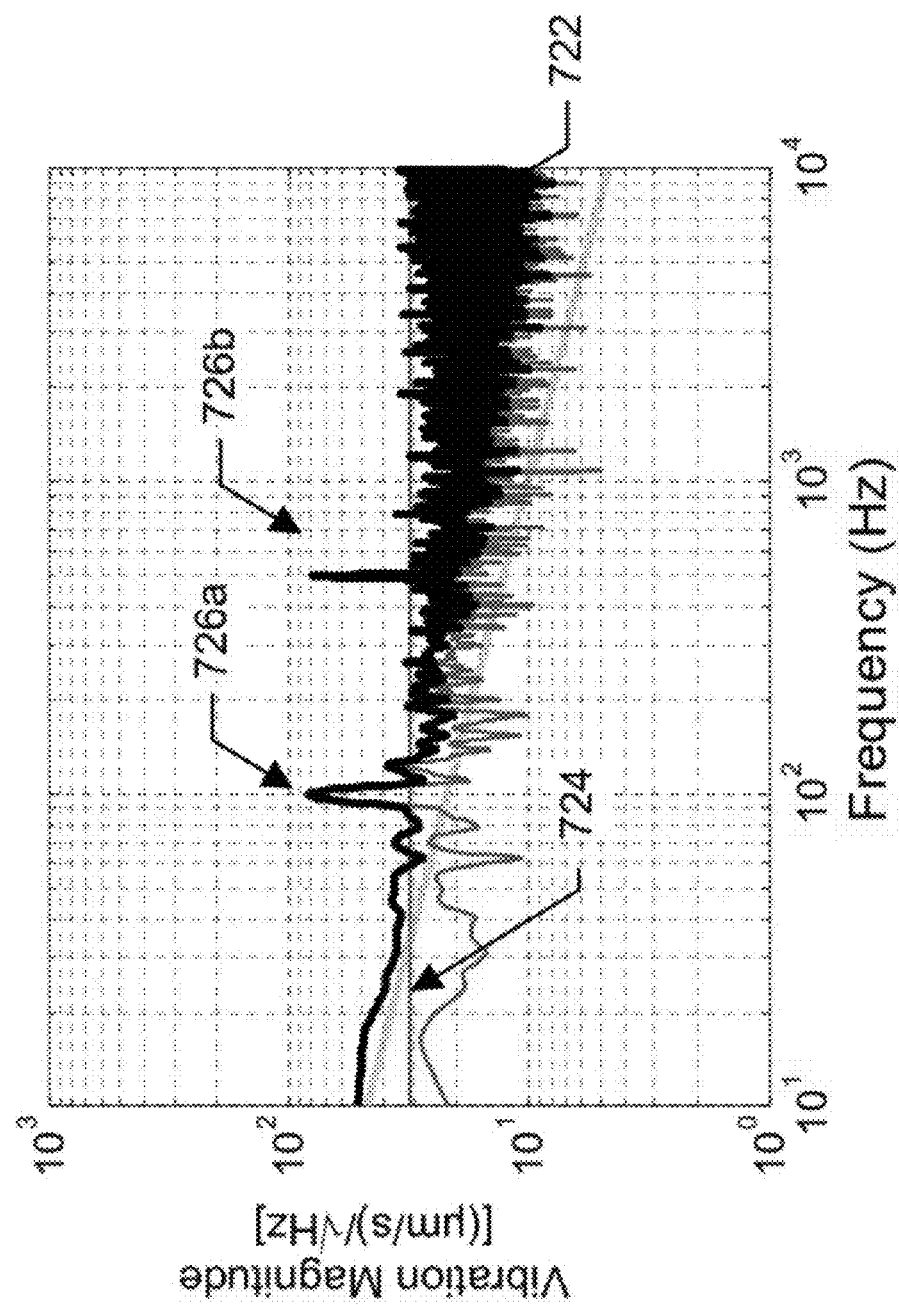
FIG. 9A is a plot showing an achieved noise equivalent velocity (NEVV) versus frequency at a carrier-to-noise ratio (CNR) of 3 for the phasogram of FIG. 6D.
Figure 9B:
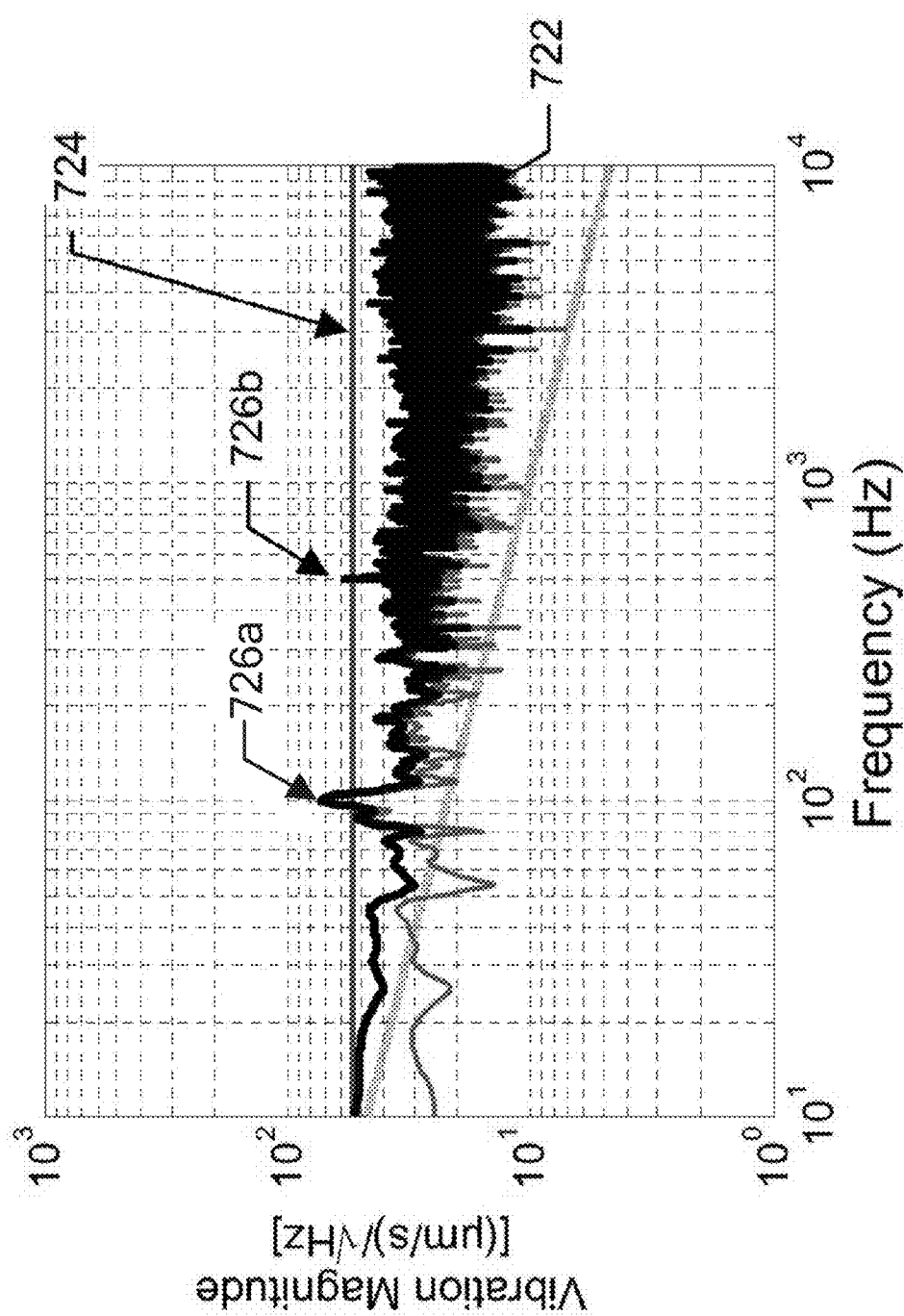
FIG. 9B is a plot showing an achieved noise equivalent velocity (NEVV) versus frequency at a carrier-to-noise ratio (CNR) of 1 for the phasogram of FIG. 6D.

For example, FIGS. 9A and 9B show the vibration spectrum obtained via a phasogram for the test conditions in Table 1 (e.g., test vibration tones at 100 Hz, 500 Hz, and 9 kHz) for a CNR of 3 (FIG. 9A) and 1 (FIG. 9B). As shown in FIG. 9A, at a CNR of 3 dB, the phasogram is still able to detect peaks 726a and 726b, although the 9 kHz signal is no longer detected. As shown in FIG. 9B, at a CNR of 1, peaks 726a and 726b are just barely above the NEVV noise floor.

Since both spectrogram and phasogram calculations can be performed on the same return signals, in some embodiments, spectrograms might also be employed to generate a coarse velocity time history that can then be used by the phasogram to reference the phase offset. The sampling rate of the phasogram is selected such that the phase won't shift more than a per sample to avoid phase ambiguities yielding an erroneous offset.

Figure 10:
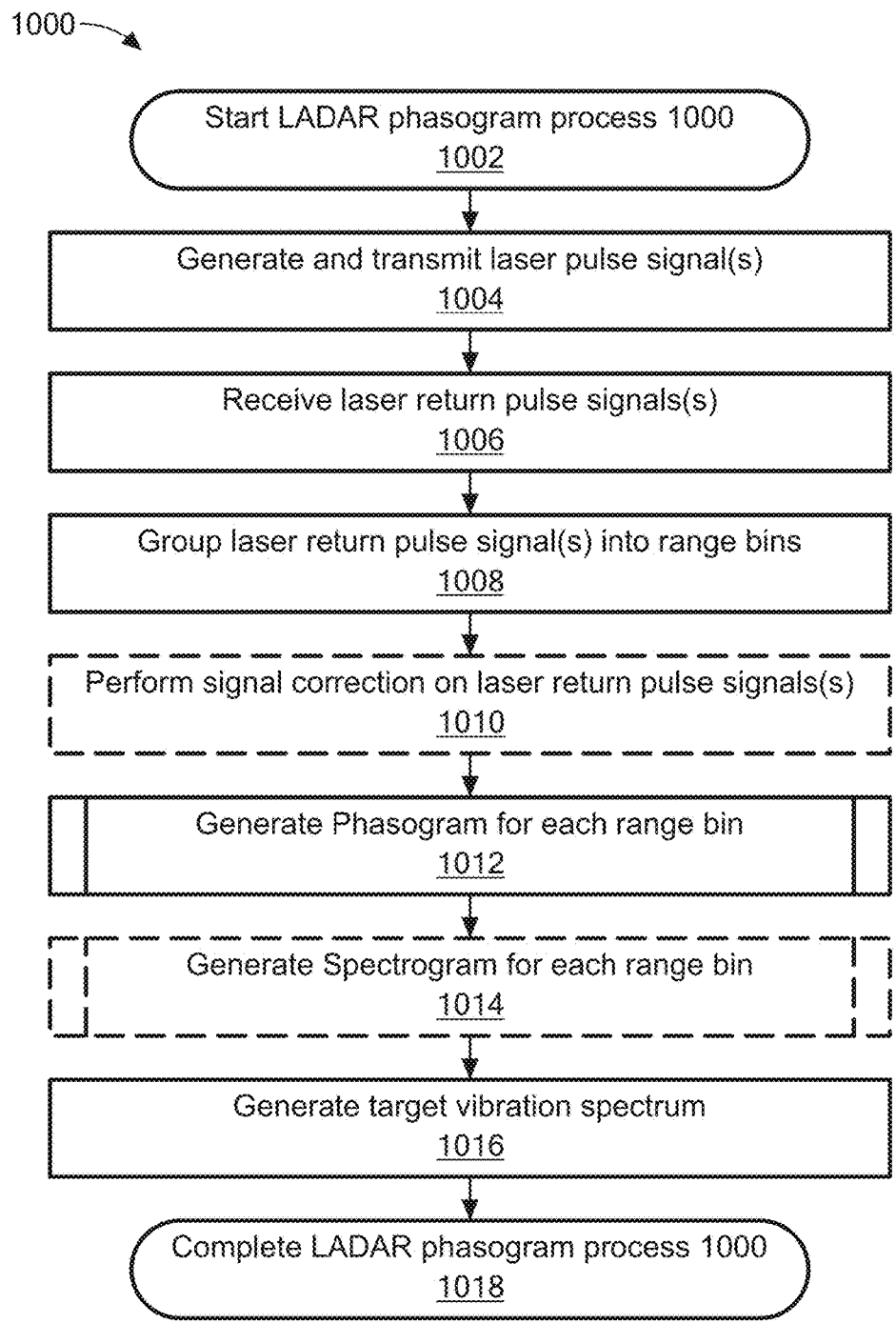
FIG. 10 is a flow diagram showing a method of operating the LADAR system of FIG. 2, in accordance with described embodiments.

Referring to FIG. 10, a flow diagram of LADAR phasogram process 1000 is shown that may be performed by LADAR transceiver 104 of FIG. 1. At block 1002, process 1000 begins. At block 1004, LADAR transceiver 104 generates and transmits the LADAR transmit signal (e.g., LADAR transmit signal 257(T) of FIG. 2). At block 1006, LADAR transceiver 104 receives return signals reflected by the target (e.g., LADAR return signal 257(R) of FIG. 2). At block 1008, LADAR processor 222 groups the return signals into one or more range bins (e.g., range bins 306 of FIG. 3). At block 1010, in some embodiments, signal correction is optionally performed on the return signals, for example to correct for motion of LADAR transceiver 104, or other signal filtering and correction. At block 1012, LADAR processor 222 generates a phasogram for each range bin, as will be described in regard to FIG. 11. At block 1014, in some embodiments, spectrograms may also be determined for each range bin. At block 1016, the target vibration spectrum is generated by LADAR processor 222, for example based on the phasograms generated at block 1012. In some embodiments, at block 1016, LADAR processor 222 may determine a course vibration spectrum based upon the spectrograms generated at block 1014, and determine a fine vibration spectrum based upon the phasograms generated at block 1012. The generated vibration spectrum (or spectra) may be provided as LADAR output 263 for further processing. At block 1018, process 1000 completes.

Figure 11:
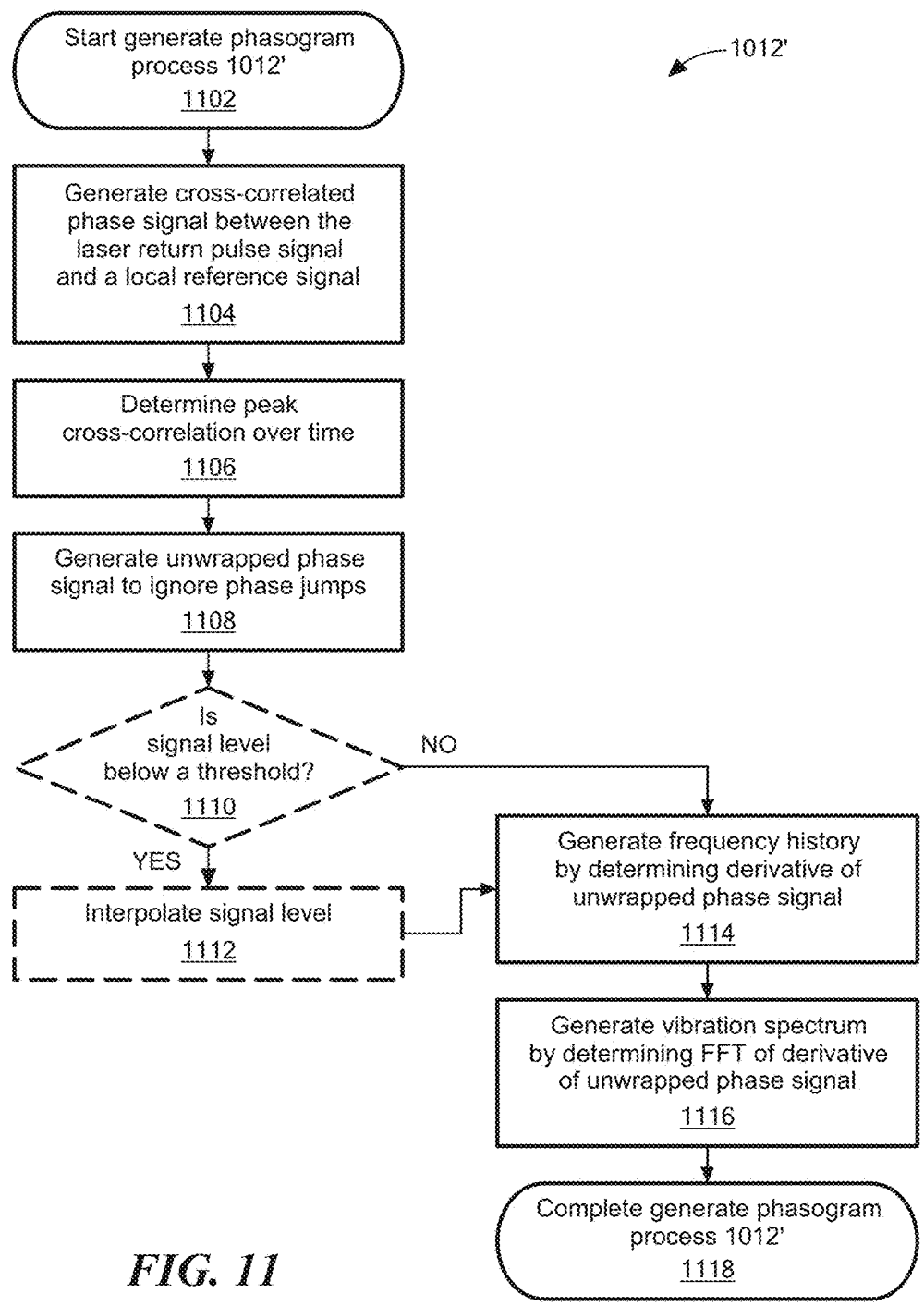
FIG. 11 is a flow diagram showing additional detail of a step to generate a phasogram of the process of FIG. 10, in accordance with described embodiments.

FIG. 11 shows additional detail of the phasogram generation process of block 1012, shown as sub-process 1012', which is repeated for each range bin. At block 1102, sub-process 1012' begins. At block 1104, a cross-correlated phase signal is generated to determine a relative phase between the return signal reflected off the target and a reference signal (e.g., local oscillator signal 269). In some embodiments, the cross-correlated phase signal is digitized (e.g., sampled). At block 1106, a sequence of cross-correlations is generated for each given range bin, for example as shown in FIG. 6A. Based on the sequence of cross-correlations for a given range bin, a single column of the resultant phasogram is generated and plotted as a function of time, as shown in FIG. 6B. From each vertical slice of the phasogram, an estimation of the peak is made, creating a derived phase signal as a function of time (e.g., 604 of FIG. 6B). Vertical lines are added to the spectrogram for as long as the pre-determined observation time.

At block 1108, the phase is unwrapped (e.g., the phase jumps at the end of each a interval are removed) to generate an unwrapped phase signal such as shown in FIG. 6D. In some embodiments, blocks 1110 and 1112 may be optionally performed. At block 1110, if the return signal is below a threshold, then at block 1112, the signal level may be interpolated based on one or more surrounding signal sample values, for example to reduce the effects of speckle and fading. If, at block 1110, the return signal was at or above the threshold, then sub-process 1012' proceeds to block 1114. In embodiments where blocks 1110 and 1112 are not performed, sub-process 1012' proceeds from block 1108 to block 1114.

At block 1114, a frequency history of the return signal is determined. In described embodiments, the frequency history is determined by determining the derivative of the unwrapped phase signal generated at block 1108. At block 1116, the vibration spectrum is determined by performing a Fourier transform (e.g., a fast Fourier transform or FFT) of the derivative determined at block 1114, such as the vibration spectrum shown in FIG. 6C. At block 1118, sub-process 1012' completes.

Figure 12:
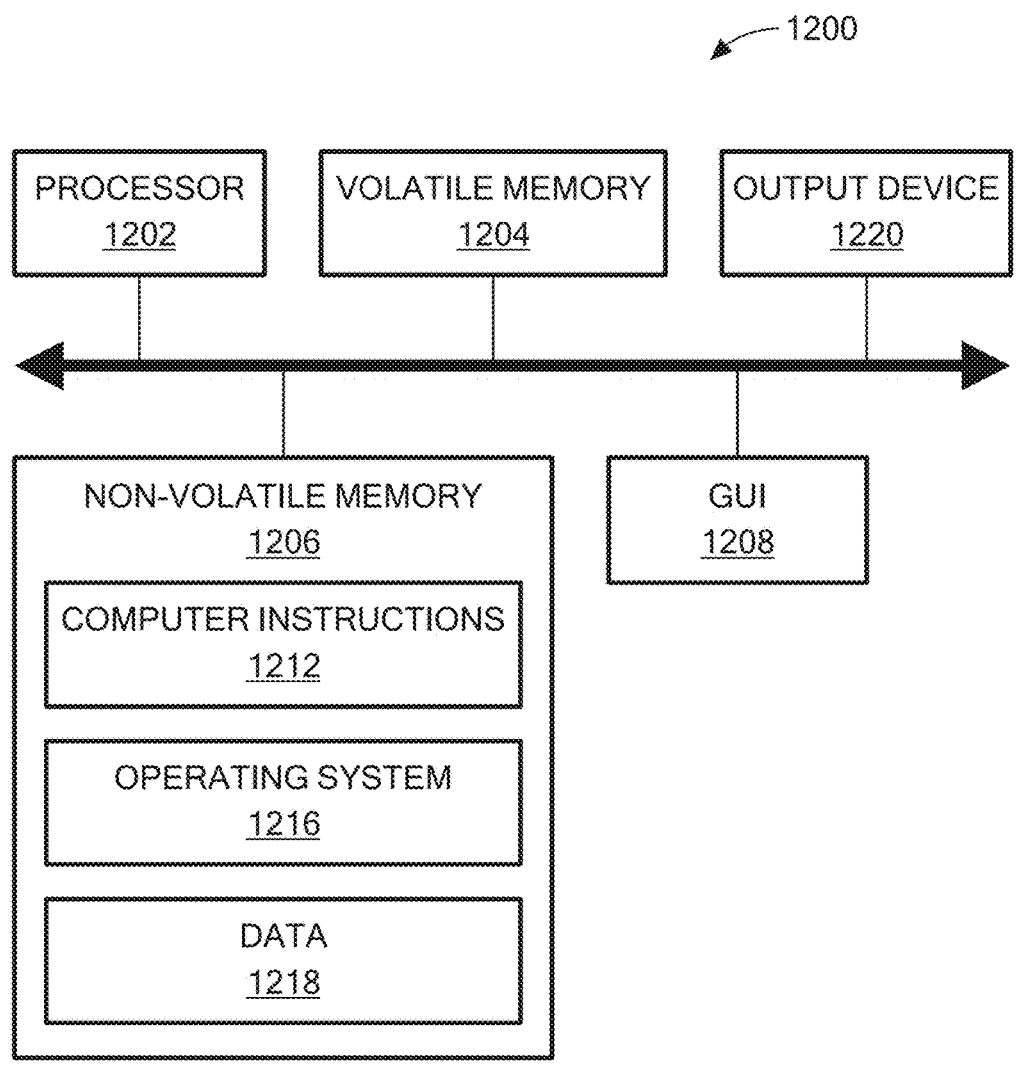
FIG. 12 is a block diagram showing a hardware architecture of a LADAR processor of the LADAR system of FIG. 2.

Referring to FIG. 12, in some embodiments, LADAR processor 222 may be implemented as one or more computers. Computer 1200 may include processor 1202, volatile memory 1204 (e.g., RAM), non-volatile memory 1206 (e.g., a hard disk drive, solid state drive such as a flash drive, a hybrid magnetic and solid state drive, etc.), graphical user interface (GUI) 1208 (e.g., a display or touchscreen, etc.) and input/output (I/O) device 1220 (e.g., a mouse, a keyboard, a touchscreen, and so forth). Non-volatile memory 1206 stores computer instructions 1212, an operating system 1216 and data 1218 such that, for example, the computer instructions 1212 are executed by the processor 1202 out of volatile memory 1204 to perform at least a portion of processes 1000 and 1012' (e.g., FIGS. 10 and 11). Program code may be applied to data entered using an input device of GUI 1208 or received from I/O device 1220.

Processes 1000 and 1012' (e.g., FIGS. 10 and 11) are not limited to use with the hardware and software of FIG. 12 and may find applicability in any computing or processing environment and with any type of machine or set of machines that is capable of running a computer program. Processes 1000 and 1012' (e.g., FIGS. 10 and 11) may be implemented in hardware, software, or a combination of the two.

The processes described herein are not limited to the specific embodiments described. For example, processes 1000 and 1012' are not limited to the specific processing order shown in FIGS. 10 and 11. Rather, any of the blocks of processes 1000 and 1012' may be re-ordered, combined or removed, performed in parallel or in serial, as necessary, to achieve the results set forth herein.

Processor 1202 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:

1. A method of operating a laser detection and ranging (LADAR) system, the method comprising:
    transmitting a laser signal towards a target, the laser signal comprising a train of coherent pulses;
    receiving a return signal based on a reflection from the target of the transmitted laser signal; and
    forming one or more range bins from the return signal, the one or more range bins each comprising a train of coherent pulses formed based upon the transmitted laser signal;
    for each range bin:
        generating a phasogram associated with the train of coherent pulses, the phasogram generated by determining a relative phase between the return signal and a reference signal; and generating a vibration spectrum of the return signal based upon the generated phasogram.

2. The method of claim 1, further comprising:
compensating for at least one of: speckle, fading and motion of the LADAR system.

3. The method of claim 2, wherein the compensating comprises:
if the return signal is below a threshold, interpolating a value of the return signal based upon one or more recent values of the return signal.

4. The method of claim 1, further comprising:
generating the reference signal based upon a local oscillator signal of the LADAR system;
for each range bin:
generating a sequence of cross-correlated phase signals, each cross-correlated phase signal having a peak of the relative phase between the return signal and the reference signal;
tracking the peaks of each cross-correlated phase signal; and
based upon the tracked peaks, generating a column of the phasogram as a function of time.

5. The method of claim 4, further comprising determining a frequency history of the return signal based upon the determined relative phase.

6. The method of claim 5, wherein generating the vibration spectrum of the return signal based upon the generated phasogram comprises:
determining an unwrapped phase signal based upon the tracked peaks;
determining the frequency history of the return signal by determining a derivative of the unwrapped phase signal; and
performing a Fourier transform on the determined frequency history.

7. The method of claim 6, wherein the Fourier transform is a fast Fourier transform (FFT).

8. The method of claim 6, wherein the phasogram is range-resolved.

9. The method of claim 6, wherein determining the unwrapped phase signal removes one or more phase jumps of the tracked peaks.

10. The method of claim 1, further comprising:
for each range bin, generating a spectrogram associated with the train of coherent pulses, the spectrogram based upon one or more instantaneous velocity measurements of the return signal.

11. The method of claim 10, further comprising:
generating a course vibration spectrum based upon the generated spectrogram; and
generating a fine vibration spectrum based upon the generated phasogram.

12. An article comprising a non-transitory machine-readable medium that stores executable instructions, the instructions causing a machine to execute the steps of:
transmitting a laser signal towards a target, the laser signal comprising a train of coherent pulses;
receiving a return signal based on a reflection from the target of the transmitted laser signal; and
forming one or more range bins from the return signal, the one or more range bins each comprising a train of coherent pulses formed based upon the transmitted laser signal;
for each range bin:
generating a phasogram associated with the train of coherent pulses, the phasogram generated by determining a relative phase between the return signal and a reference signal; and
generating a vibration spectrum of the return signal based upon the generated phasogram.

13. An apparatus, comprising:
a transmitter to transmit a laser signal toward a target, the laser signal comprising a train of coherent pulses;
a receiver to receive a return signal based on a reflection from the target of the transmitted laser signal; and
circuitry to:
form one or more range bins from the return signal, the one or more range bins each comprising a train of coherent pulses formed based upon the transmitted laser signal;
for each range bin:
generate a phasogram associated with the train of coherent pulses, the phasogram generated by determining a relative phase between the return signal and a reference signal; and
generate a vibration spectrum of the return signal based upon the generated phasogram.

14. The apparatus of claim 13, further comprising circuitry to compensate for at least one of: speckle, fading and motion of the LADAR system.

15. The apparatus of claim 14, wherein if the return signal is below a threshold, the circuitry is configured to interpolate a value of the return signal based upon one or more recent values of the return signal.

16. The apparatus of claim 13, further comprising circuitry to:
generate the reference signal based upon a local oscillator signal of the LADAR system;
for each range bin:
generate a sequence of cross-correlated phase signals, each cross-correlated phase signal having a peak of the relative phase between the return signal and the reference signal;
track the peaks of each cross-correlated phase signal; and
based upon the tracked peaks, generate a column of the phasogram as a function of time.

17. The apparatus of claim 16, further comprising circuitry to determine a frequency history of the return signal based upon the determined relative phase.

18. The apparatus of claim 17, further comprising circuitry to:
determine an unwrapped phase signal based upon the tracked peaks;
determine the frequency history of the return signal by determining a derivative of the unwrapped phase signal; and
perform a Fourier transform on the determined frequency history.

19. The apparatus of claim 13, further comprising circuitry to, for each range bin, generate a spectrogram associated with the train of coherent pulses, the spectrogram based upon one or more instantaneous velocity measurements of the return signal.

20. The apparatus of claim 19, further comprising circuitry to:
generate a course vibration spectrum based upon the generated spectrogram; and
generate a fine vibration spectrum based upon the generated phasogram.

21. The apparatus of claim 13, wherein the receiver comprises a Geiger-mode avalanche photodiode (GMAPD) receiver.

\* \* \* \* \*